US012574380B2

(12) United States Patent
Cheethirala et al.

(10) Patent No.: US 12,574,380 B2
(45) Date of Patent: Mar. 10, 2026

(54) APPLYING SECURITY POLICIES BASED ON ENDPOINT AND USER ATTRIBUTES

(71) Applicant: Juniper Networks, Inc., Sunnyvale, CA (US)

(72) Inventors: Madhava Rao Cheethirala, San Jose, CA (US); Raja Rao Tadimeti, San Jose, CA (US); Praveen Jain, Cupertino, CA (US); Natarajan Manthiramoorthy, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 121 days.

(21) Appl. No.: 18/551,909

(22) PCT Filed: Jul. 12, 2022

(86) PCT No.: PCT/US2022/073654
§ 371 (c)(1),
(2) Date: Sep. 22, 2023

(87) PCT Pub. No.: WO2023/015100
PCT Pub. Date: Feb. 9, 2023

(65) Prior Publication Data
US 2024/0154970 A1 May 9, 2024

Related U.S. Application Data

(60) Provisional application No. 63/230,232, filed on Aug. 6, 2021.

(51) Int. Cl.
*H04L 9/40* (2022.01)

(52) U.S. Cl.
CPC .......... *H04L 63/102* (2013.01); *H04L 63/101* (2013.01); *H04L 63/20* (2013.01)

(58) Field of Classification Search
CPC ...... H04L 63/102; H04L 63/101; H04L 63/20
See application file for complete search history.

(56) References Cited

U.S. PATENT DOCUMENTS 8,060,529 B2 * 11/2011 Hu .......................... H04L 51/04
726/28
10,057,243 B1 * 8/2018 Kumar .................. H04L 9/0891
(Continued)

OTHER PUBLICATIONS

International Search Report and Written Opinion of International Application No. PCT/US2022/073654 dated Sep. 19, 2022, 13 pp.
(Continued)

*Primary Examiner* — Harris C Wang
(74) *Attorney, Agent, or Firm* — Shumaker & Sieffert, P.A.

(57) ABSTRACT

An example network access control system includes a memory storing one or more security policies for an enterprise network; and one or more processors coupled to the memory and configured to: receive a request to connect to the enterprise network from a client device of a user, in response to the receipt of the request, determine one or more user attributes associated with the user and one or more endpoint attributes of the client device, identify a security policy of the one or more security policies based on the one or more user attributes and the one or more endpoint attributes, and configure an access control module of a network device of the enterprise network in accordance with the security policy.

17 Claims, 13 Drawing Sheets

900

```
┌─────────────────────────────────────────┐
│ RECEIVE A REQUEST TO CONNECT TO AN       │── 905
│ ENTERPRISE NETWORK FROM A CLIENT DEVICE  │
│ OF A USER                                │
└─────────────────────────────────────────┘
                    │
                    ▼
┌─────────────────────────────────────────┐
│ IN RESPONSE TO THE RECEIVING THE REQUEST,│── 910
│ DETERMINE ONE OR MORE USER ATTRIBUTES    │
│ ASSOCIATED WITH THE USER AND ONE OR MORE │
│ ENDPOINT ATTRIBUTES OF THE CLIENT DEVICE │
└─────────────────────────────────────────┘
                    │
                    ▼
┌─────────────────────────────────────────┐
│ IDENTIFY A SECURITY POLICY BASED ON THE  │── 915
│ ONE OR MORE USER ATTRIBUTES AND THE ONE  │
│ OR MORE END-POINT ATTRIBUTES             │
└─────────────────────────────────────────┘
                    │
                    ▼
┌─────────────────────────────────────────┐
│ CONFIGURE A NETWORK DEVICE OF THE        │── 920
│ ENTERPRISE NETWORK IN ACCORDANCE WITH    │
│ THE SECURITY POLICY                      │
└─────────────────────────────────────────┘
```

(56) References Cited

U.S. PATENT DOCUMENTS

| | | | | |
|---|---|---|---|---|
| 11,811,736 | B2 * | 11/2023 | Allam | H04L 63/0263 |
| 2011/0004915 | A1 | 1/2011 | Oksanen et al. | |
| 2014/0130180 | A1 * | 5/2014 | Balasubramanyan | |
| | | | | G06F 21/604 |
| | | | | 726/27 |
| 2014/0173686 | A1 | 6/2014 | Kgil et al. | |
| 2017/0005886 | A1 | 1/2017 | Dade et al. | |
| 2017/0251025 | A1 * | 8/2017 | Varley | H04L 63/20 |
| 2019/0208409 | A1 * | 7/2019 | Brisebois | H04W 8/245 |
| 2020/0106783 | A1 * | 4/2020 | Trimby | H04L 63/0272 |
| 2020/0213236 | A1 | 7/2020 | Safavi | |
| 2020/0213358 | A1 * | 7/2020 | Helfinstine | H04L 9/3236 |
| 2020/0236008 | A1 | 7/2020 | Safavi | |
| 2020/0267047 | A1 | 8/2020 | Safavi | |
| 2021/0029174 | A1 * | 1/2021 | Kunduru | H04L 63/20 |
| 2021/0117561 | A1 | 4/2021 | Carroll, Jr. et al. | |
| 2021/0314388 | A1 * | 10/2021 | Zhou | H04L 61/103 |
| 2023/0098281 | A1 * | 3/2023 | Nainar | G06V 40/173 |

OTHER PUBLICATIONS

Juniper Networks, Inc, "Control Network Access Using Device Identity Authentication", Junos® OS, Jan. 2021, Retrieved from the Internet on Aug. 28, 2022 from URL: https://www.juniper.net/documentation/us/en/software/junos/authentication-firewall/topics/topic-map/security-user-auth-control-network-access.html., 24 pp.

Extended Search Report from counterpart European Application No. 22854020.9 dated Jan. 14, 2025, p. 9.

Xie et al., "A topic-centric access control model for the publish/subscribe paradigm", Concurrency and Computation: Practice and Experience, vol. 32, No. 9, Dec. 30, 2019, 14 pp.

Response to Communication Pursuant to Rules 161(1) and 162 EPC dated Mar. 14, 2024, from counterpart European Application No. 22854020.9, filed Sep. 13, 2024, 9 pp.

International Preliminary Report on Patentability from International Application No. PCT/US2022/073654 dated Feb. 15, 2024, 11 pp.

Response to Communication Pursuant to Rules 70(2) and 70a(2) EPC dated Jan. 31, 2025, from counterpart European Application No. 22854020.9, filed Jun. 25, 2025, 22 pp.

* cited by examiner

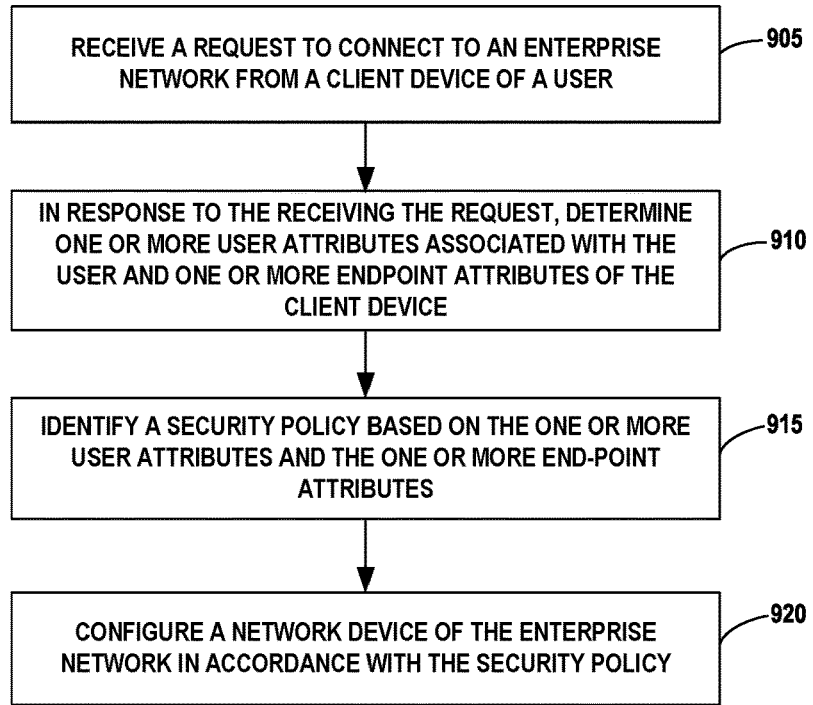

┌─────────────────────────────────────────────────┐
│  RECEIVE A REQUEST TO CONNECT TO AN ENTERPRISE    │ ─ 905
│  NETWORK FROM A CLIENT DEVICE OF A USER           │
└─────────────────────────────────────────────────┘

┌─────────────────────────────────────────────────┐
│  IN RESPONSE TO THE RECEIVING THE REQUEST, DETERMINE │ ─ 910
│  ONE OR MORE USER ATTRIBUTES ASSOCIATED WITH THE  │
│  USER AND ONE OR MORE ENDPOINT ATTRIBUTES OF THE  │
│  CLIENT DEVICE                                    │
└─────────────────────────────────────────────────┘

┌─────────────────────────────────────────────────┐
│  IDENTIFY A SECURITY POLICY BASED ON THE ONE OR MORE │ ─ 915
│  USER ATTRIBUTES AND THE ONE OR MORE END-POINT    │
│  ATTRIBUTES                                       │
└─────────────────────────────────────────────────┘

┌─────────────────────────────────────────────────┐
│  CONFIGURE A NETWORK DEVICE OF THE ENTERPRISE     │ ─ 920
│  NETWORK IN ACCORDANCE WITH THE SECURITY POLICY   │
└─────────────────────────────────────────────────┘

FIG. 9

APPLYING SECURITY POLICIES BASED ON ENDPOINT AND USER ATTRIBUTES

RELATED APPLICATIONS

This applications claims the benefit of U.S. Provisional Application Ser. No. 63/230,232, entitled "METHODS FOR APPLYING SECURITY POLICIES BASED ON END-POINT AND USER ATTRIBUTES AND DEVICES THEREOF" and filed Aug. 6, 2021, the entire contents of which is incorporated by reference herein.

TECHNICAL FIELD

The disclosure relates generally to computer networks and, more specifically, to managing access to computer networks.

BACKGROUND

Commercial premises or sites, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies.

Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible AP. In order to gain access to a wireless network, a wireless client device may first need to authenticate to the AP. Authentication may occur via a handshake exchange between the wireless client device, the AP, and an Authentication, Authorization, and Accounting (AAA) server controlling access at the AP.

SUMMARY

In general, this disclosure describes one or more techniques for applying security policies using attributes of endpoint devices and users of endpoint devices that are obtained by a network access control (NAC) system. In some aspects, the network access control (NAC) system can be configured to authenticate client devices to a network when the client device requests to connect to the network. As part of a connection and/or authentication process, the NAC system can obtain attributes about the client device and the user of the client device. The NAC system can provide the attributes to a security enforcer, such as a firewall, which can utilize the client device attributes and the user attributes to determine a security policy to apply to network traffic to and from the client device. The techniques disclosed herein facilitate the development of security policies that may be based on a network administrator's intent rather than lower level rules that may be limited to rules based on network address or user roles. As an example, a network administrator can express a security policy "if the user is in the accounting department and is logging in on a corporate laptop, allow access to accounting servers and email servers" along with a rule "if the user is in the accounting department and logging in on a smartphone, allow access to email servers." Thus, a user in the accounting department may access both accounting servers and email servers when logging in to the network on a corporate laptop that the network administrator can be reasonably assured has appropriate security software. However, the user may only access email servers and not the accounting servers when logging in to the network via a personal device such as a smartphone that may not be as secure as the corporate laptop.

The techniques of this disclosure provide one or more technical advantages and practical applications. As one example, existing systems typically express security policies in terms of network addresses, such as Internet Protocol (IP) addresses or Media Access Control (MAC) addresses. However, this requires the network administrator know the network address of the user. This can be difficult for several reasons. First, network addresses in wireless and wired networks are typically provided via a Dynamic Host Configuration Protocol. In such cases, the network address for a user's client device may vary from one network login to another. Additionally, it is common for users to login to a network using personal devices. For both reasons, it can be difficult, if not impossible, for a network administrator to know the network address of a user's device prior to the device being used on a network. It is difficult for a network administrator to formulate a security policy based on network address when the network address may change from login to login, or when the client device is a user's personal device. The techniques disclosed herein provide an advantage in that it is not necessary for a network administrator to know specific network addresses of a device that may login to the network. Instead, the network administrator can determine a security policy based on higher level attributes of both the user and the device used by the user to login to the network.

In one example, the disclosure is directed to a network access control system that includes a memory storing one or more security policies for an enterprise network; and one or more processors coupled to the memory and configured to: receive a request to connect to the enterprise network from a client device of a user, in response to the receipt of the request, determine one or more user attributes associated with the user and one or more endpoint attributes of the client device, and provide the user attributes and the endpoint attributes to a security enforcer configured to: identify a security policy of the one or more security policies based on the one or more user attributes and the one or more endpoint attributes, and configure an access control module of a network device of the enterprise network in accordance with the security policy.

In another example, the disclosure is directed to a method that includes receiving, by a processing circuitry configured to execute a network access controller, a request to connect to an enterprise network from a client device of a user; in response to the receiving the request, determining, by the network access controller, one or more user attributes associated with the user and one or more endpoint attributes of the client device; and providing, by the network access controller, the one or more user attributes and the one or more endpoint attributes to a security enforcer configured to: apply a security policy based on the one or more user attributes and the one or more endpoint attributes, and configure a network device of the enterprise network in accordance with the security policy.

In further example, the disclosure is directed to a network system that includes a security enforcer comprising processing circuitry configured to enforce a security policy with respect to a plurality of network devices; and a network access control system comprising a memory and one or more processors coupled to the memory, the network access control module configured to: receive a request to connect to the enterprise network from a client device of a user, in response to the receipt of the request, determine one or more user attributes associated with the user and one or more endpoint attributes of the client device, and provide the user attributes and the endpoint attributes to the security enforcer, wherein the security enforcer is configured to: identify a security policy of the one or more security policies based on the one or more user attributes and the one or more endpoint attributes, and configure an access control module of a network device of the enterprise network in accordance with the security policy.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 9 is a flow diagram illustrating an example operation of a network access controller, in accordance with one or more techniques of this disclosure.

DETAILED DESCRIPTION

Figure 1A:
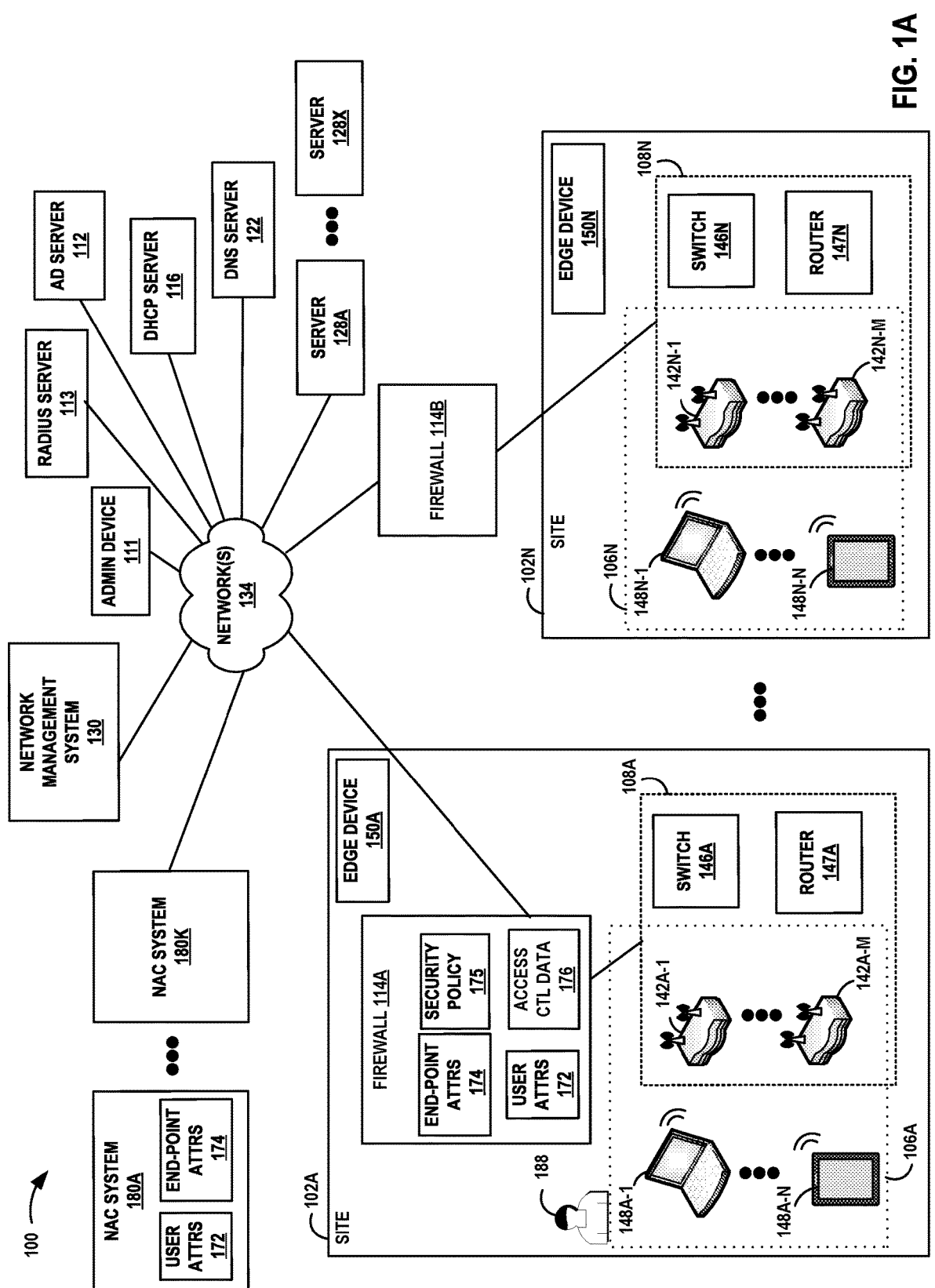
FIG. 1A is a block diagram of an example network system including a network management system and network access control systems, in accordance with one or more techniques of the disclosure.

FIG. 1A is a block diagram of an example network system 100 including network access control (NAC) systems 180A-180K and network management system (NMS) 130, in accordance with one or more techniques of this disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of network access server (NAS) devices 108A-108N, such as access points (APs) 142, switches 146, and routers 147. NAS devices may include any network infrastructure devices capable of authenticating and authorizing client devices to access an enterprise network. For example, site 102A includes a plurality of APs 142A-1 through 142A-M, a switch 146A, and a router 147A. Similarly, site 102N includes a plurality of APs 142N-1 through 142N-M, a switch 146N, and a router 147N. Each AP 142 may be any type of wireless access point, including, but not limited to, a commercial or enterprise AP, a router, or any other device that is connected to a wired network and is capable of providing wireless network access to client devices within the site. In some examples, each of APs 142A-1 through 142A-M at site 102A may be connected to one or both of switch 146A and router 147A. Similarly, each of APs 142N-1 through 142N-M at site 102N may be connected to one or both of switch 146N and router 147N.

In the example of FIG. 1A, site 102A also includes an on-premises firewall 114A, which may be a firewall service running on a router, such as router 147A, configured to apply security policies to data traffic from client devices at site 102A to devices or systems within the enterprise network. The illustrated example of FIG. 1A also includes a cloud-based firewall 114B connected to NAS devices 108N at site 102N. Cloud-based firewall 114B may be a firewall service running on a physical or virtual router configured to apply security policies to data traffic from client devices at site 102N to devices or systems within the enterprise network.

Each site 102A-102N also includes a plurality of client devices, otherwise known as user equipment devices (UEs), referred to generally as UEs or client devices 148, representing various wireless-enabled devices within each site. For example, a plurality of client devices 148A-1 through 148A-K are currently located at site 102A. Similarly, a plurality of client devices 148N-1 through 148N-K are currently located at site 102N. Each client device 148 may be any type of wireless client device, including, but not limited to, a mobile device such as a smart phone, tablet or laptop computer, a personal digital assistant (PDA), a wireless terminal, a smart watch, smart ring, or other wearable device. Client devices 148 may also include wired client-side devices, e.g., IoT devices such as printers, security devices, environmental sensors, or any other device connected to the wired network and configured to communicate over one or more wireless networks 106.

In order to provide wireless network services to client devices 148 and/or communicate over the wireless networks 106, APs 142 and the other wired client-side devices at sites 102 are connected, either directly or indirectly, to one or more network devices (e.g., switches, routers, gateways, or the like) via physical cables, e.g., Ethernet cables. Although illustrated in FIG. 1A as if each site 102 includes a single switch and a single router, in other examples, each site 102 may include more or fewer switches and/or routers. In addition, two or more switches at a site may be connected to each other and/or connected to two or more routers, e.g., via a mesh or partial mesh topology in a hub-and-spoke architecture. In some examples, interconnected switches 146 and routers 147 comprise wired local area networks (LANs) at sites 102 hosting wireless networks 106.

Example network system 100 also includes various networking components for providing networking services within the wired network including, as examples, NAC systems 180 including or providing access to Authentication, Authorization and Accounting (AAA) servers for authenticating users and/or client devices 148, an active directory server 112 and/or a RADIUS server 113 for managing permissions and access to network resources, a Dynamic Host Configuration Protocol (DHCP) server 116 for dynamically assigning network addresses (e.g., IP addresses) to client devices 148 upon authentication, a Domain Name System (DNS) server 122 for resolving domain names into network addresses, a plurality of servers 128A-128X (collectively "servers 128") (e.g., web servers, databases servers, file servers and the like), and NMS 130. As shown in FIG. 1A, the various devices and systems of network 100 are coupled together via one or more network (s) 134, e.g., the Internet and/or an enterprise intranet.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such as alerts, alarms, graphical indicators on dashboards, log messages, text/SMS messages, email messages, and the like, and/or recommendations regarding wireless network issues to a site or network administrator ("admin") interacting with and/or operating admin device 111. In some examples, NMS 130 operates in response to configuration input received from the administrator interacting with and/or operating admin device 111.

The administrator and admin device 111 may comprise IT personnel and an administrator computing device associated with one or more of sites 102. Admin device 111 may be implemented as any suitable device for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or any other computing device that may be operated by a user and/or present a user interface in accordance with one or more aspects of the present disclosure. Admin device 111 may be physically separate from and/or in a different location than NMS 130 such that admin device 111 may communicate with NMS 130 via network 134 or other means of communication.

In some examples, one or more of NAS devices 108, e.g., APs 142, switches 146, and routers 147, may connect to edge devices 150A-150N via physical cables, e.g., Ethernet cables. Edge devices 150 comprise cloud-managed, wireless local area network (LAN) controllers. Each of edge devices 150 may comprise an on-premises device at a site 102 that is in communication with NMS 130 to extend certain microservices from NMS 130 to the on-premises NAS devices 108 while using NMS 130 and its distributed software architecture for scalable and resilient operations, management, troubleshooting, and analytics.

Each one of the network devices of network system 100, e.g., NAC systems 180, servers 112, 113, 116, 122 and/or 128, firewalls 114, APs 142, switches 146, routers 147, client devices 148, edge devices 150, and any other servers or devices attached to or forming part of network system 100, may include a system log or an error log module wherein each one of these network devices records the status of the network device including normal operational status and error conditions. Throughout this disclosure, one or more of the network devices of network system 100, e.g., servers 112, 113, 116, 122 and/or 128, firewalls 114, APs 142, switches 146, routers 147, and client devices 148, may be considered "third-party" network devices when owned by and/or associated with a different entity than NMS 130 such that NMS 130 does not directly receive, collect, or otherwise have access to the recorded status and other data of the third-party network devices. In some examples, edge devices 150 may provide a proxy through which the recorded status and other data of the third-party network devices may be reported to NMS 130.

In the example of FIG. 1A, each of NAC systems 180 comprises a cloud-based network access control service at multiple, geographically distributed points of presence. Typically, network access control functionality is offered by on-premises appliances that are limited by processing power and memory as well as maintenance and upgrade issues. Offering cloud-based network access control services avoids the limitations and improves network administration. A centralized, cloud-based deployment of network access control, however, introduces issues with latency and failures that may block client devices from network access.

In accordance with the disclosed techniques, NAC systems 180 provide multiple points of presence or NAC clouds at several geographic regions. NMS 130 is configured to manage NAC configuration, including access policies for enterprise networks, and push the appropriate NAC configuration data or files to the respective NAC clouds 180A-180K. In this way, NAC systems 180 provide the same benefits as a centralized, cloud-based network access control service with lower latency and high availability.

NAC systems 180 provide a way of authenticating client devices 148 to access wireless networks 106 of branch or campus enterprise networks. NAC systems 180 may each include or provide access to an Authentication, Authorization, and Accounting (AAA) server, e.g., RADIUS server 113, to authenticate client devices 148 prior to providing access to the enterprise network via the NAS devices 108. In some examples, NAC systems 180 may enable certificate-based authentication of client devices or enable interaction with user directory services, e.g., an active directory at AD server 112, to authenticate the client devices.

NAC systems 180 may identify client devices 148 and provide client devices 148 with the appropriate authorizations or access policies based on their identities, e.g., by assigning the client devices to certain virtual local area networks (VLANs), applying certain access control lists (ACLs), directing the client devices to certain registration portals, or the like. NAC systems 180 may identify client devices 148 by analyzing network behavior of the client devices, referred to as fingerprinting. Fingerprint information for a given client device includes one or more attributes associated with the client device, such as attributes associated with the client device itself, attributes associated with a user of the client device, and/or attributes associated with network connectivity of the client device. In some examples, fingerprinting client devices may be performed based on media access control (MAC) addresses, DHCP options used to request IP addresses, link layer discovery protocol (LLDP) packets, Hypertext Transfer Protocol (HTTP) user agent information, location information, DNS information, and/or device type and operating system information.

Client devices 148 may include multiple different categories of devices with respect to a given enterprise, such as trusted enterprise devices, bring-your-own-device (BYOD) devices, IoT devices, and guest devices. NAC system 180 may be configured to subject each of the different categories of devices to different types of tracking, different types of authorization, and different levels of access privileges. In some examples, after a client device gains access to the enterprise network, NAC systems 180 may monitor activities of the client device to identify security concerns and, in response, re-assign the client device to a quarantine VLAN or another less privileged VLAN to restrict access of the client device.

NMS 130 is configured to operate according to an artificial intelligence/machine-learning-based computing platform providing comprehensive automation, insight, and assurance (WiFi Assurance, Wired Assurance and WAN assurance) spanning from "client," e.g., client devices 148 connected to wireless networks 106 and wired local area networks (LANs) at sites 102 to "cloud," e.g., cloud-based application services that may be hosted by computing resources within data centers.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, NMS 130 may be configured to proactively monitor and adaptively configure network 100 so as to provide self-driving capabilities.

In some examples, AI-driven NMS 130 also provides configuration management, monitoring, and automated oversight of software defined wide-area networks (SD-WANs), which operate as an intermediate network communicatively coupling wireless networks 106 and wired LANs at sites 102 to data centers and application services. In general, SD-WANs provide seamless, secure, traffic-engineered connectivity between "spoke" routers (e.g., routers 147) of the wired LANs hosting wireless networks 106 to "hub" routers further up the cloud stack toward the cloud-based application services. SD-WANs often operate and manage an overlay network on an underlying physical Wide-Area Network (WAN), which provides connectivity to geographically separate customer networks. In other words, SD-WANs extend Software-Defined Networking (SDN) capabilities to a WAN and allow network(s) to decouple underlying physical network infrastructure from virtualized network infrastructure and applications such that the networks may be configured and managed in a flexible and scalable manner.

In some examples, AI-driven NMS 130 may enable intent-based configuration and management of network system 100, including enabling construction, presentation, and execution of intent-driven workflows for configuring and managing devices associated with wireless networks 106, wired LAN networks, and/or SD-WANs. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

NAC systems 180 may apply an access policy in response to network connection requests received from client devices 148. Other types of policies, e.g., security policies, routing policies, quality of service (QoS) policies, or other configuration information, may be applied to network traffic by certain network devices, e.g., on-premises firewalls 114A, cloud-based firewalls 114B, switches 146, routers 147, access points 142, or servers 128, within network system 100.

Generally speaking, a network administrator may define a security policy 175 that specifies network traffic that is to be allowed or denied on a network. For example, APs 142, switches 146, routers 147, edge devices 15, and/or firewalls 114 may be configured to apply security policies to admit or block data traffic along data paths from client devices 148 to devices or systems within the enterprise network. In some aspects, a security policy may be provided to firewalls 114, APs 142, switches 146, routers 147, edge devices 15, which can then interpret the security policy directly to admit or block traffic in accordance with the security policy. In some aspects, a security policy may be interpreted by one network device (e.g., a firewall 114), which can then configure APs 142, switches 146, routers 147, and/or edge devices 15 in accordance with the security policy. For example, firewall 114 may interpret security policy 175 to generate access control lists (ACLs), and then provide the generated ACLs to APs 142, switches 146, routers 147, and/or edge devices 15, that implement (e.g., enforce) the security policy.

Typically, firewalls 114, and other network devices, apply security policies to data traffic based on a source IP address or a hostname associated with the client device from which the data traffic is sent. For example, in the context of network systems, a policy or access control list typically includes rules that are applied based on network addresses (e.g., IP addresses and/or port numbers). As an example, a security policy may include rules that specify that a device having a first IP address is allowed to (or blocked from) communicating with a device having a second IP address.

In accordance with the techniques of this disclosure, when a client device 148 of a user 188 requests to connect to network system 100, NAC systems 180 can obtain user attributes 172 associated with user 188 and endpoint attributes 174 of client device 148 utilized by the user to connect to the network. In some aspects, user attributes 172 can include the name of the user, groups to which the user is a member of, home-office-location of the user, grade, department, organization, role (manager, staff, contractor, etc.) or other attributes associated with user 188. In some aspects, endpoint attributes 174 can include vendor, make, model, operating system (OS) version, WiFi service set identifier (SSID), media access control (MAC) address, Internet Protocol (IP) address, time-of-connection, communication pattern, network port, location, and/or a label associated with the client device. As an example, a label may be used to identify a client device as part of a group of client devices. The communication pattern may be a communication pattern that is determined from data analyzed by NMS 130 regarding the operation of client device 148.

NAC systems 180 can provide user attributes 172 and endpoint attributes 174 to a security enforcer such as a firewall 114. Firewall 114 can interpret security policy 175 that includes rules that reflect a network administrator's intent rather than low-level network addresses. For example, the rules of security policy 175 may be based on user attributes and endpoint device attributes rather than low-level network addresses. As an example, a rule may be expressed as "if department=accounting and manager=yes, permit access to accounting_printers." An additional rule may be expressed as "if department=accounting and device=corporate laptop, permit access to accounting_printers." Thus, if user 188 is a member of the accounting department, and they are a manager or are using a corporate issued laptop, the security policy allows the user to access printers in the accounting department. However, if the user is in the accounting department, but is not a manager and using a personal tablet device to connect to the network, the user may not be permitted to access the accounting printers.

In some aspects, firewall 114 generates access control data 176 based on user attributes 172, endpoint attributes 174 and security policy 176. In some aspects, access control data 176 may be ACLs that include IP addresses that are determined according to the attributes 172, endpoint attributes 174 and security policy 176. Using the example above, firewall 114 may generate access control entries (ACEs) that correspond to the IP address of client device 148 used by user 188 and the IP addresses of network resources that the user is allowed to access according to the rules of security policy 175. In some aspects, firewall 114 can enforce security policy 175 using the access control data 176. In some aspects, firewall 114 can provide access control data 176 to network devices that are in the path of client device 148 and other network devices of network system 100.

In the example shown in FIG. 1A, user 188 of client device 148A-1 requests to connect to network 106A. In response, NAC system 180A obtains user attributes 172 and obtains endpoint attributes 174. In some aspects, user attributes 172 may be obtained from active directory server 112 and/or RADIUS server 113. In some aspects, endpoint attributes 174 may be obtained from client device 148A-1 and/or NMS 130. NAC system 180A provides user attributes 172 and endpoint attributes 174 to firewall 114A. Firewall 114A applies security policy 175 to user attributes 172 and endpoint attributes 174 to generate access control data 176. For example, firewall 114 may generate ACEs for and ACL, where the ACEs include rules based on the IP addresses of client device 148A-1 and network resources of network system 100 that the user is allowed to access using client device 148A-1. As noted above, in some aspects, firewall 114 uses access control data 176 to enforce security policy 175. In some aspects firewall 114 may, in addition or instead, provide access control data 176 to other network devices in addition to. For example, firewall 114 may provide access control data 176 to an AP 142, a switch 146, or a router 147.

Firewall 114 may provide access control data 176 to a network device in various ways. In some examples. firewall 114 may add the ACEs associated with a client device 148 and to an existing ACL, and provide the complete ACL to the network device. In cases where a network device supports multiple ACLs, firewall 114 may provide a new ACL to the network device that is added to the set of existing ACLs on the device.

In some aspects, when a client device 148 disconnects from the network (e.g., ends a network session), NAC system 180 may inform firewall 114 of the disconnection. Firewall 114 may then remove ACEs associated with the client device 148 from an ACL. For example, firewall 114 may remove ACEs associated with the client device from an ACL of a network device, and provide the updated ACL to the network device. In cases where the network device supports multiple ACLs, firewall 114 may delete the ACL associated with client device 148 from the network device. Removing ACEs and/or ACLs from a network device can be desirable because some network devices such as APs 142, switches 146 or routers 147 may have limited memory resources for storing ACLs or other data. Removing the ACEs and/or ACLs can free memory resources on the network device for other ACLs or for other purposes.

The techniques of this disclosure provide one or more technical advantages and practical applications. For example, the techniques facilitate use of a security policy 175 that has rules that can include attributes beyond the network addresses used in existing systems. For example, rules can incorporate user attributes and client device attributes that are not currently supported in existing system. The ability to include such attributes allows a network administrator to configure rules that reflect the intent of the administrator. For example, the network administrator can formulate rules using attributes that describe groups of devices and user rather than individual devices. Firewall 114 can use the intent-based rules to automatically generate access control data. As a result, a network administrator is relieved of the burden of configuring ACEs for individual client devices.

Further, the intent-based rules facilitated by the techniques of the disclosure do not have to be updated when a network address of a client device changes. As described above, network addresses for client devices 148 may be obtained from DHCP server 116, and may change from network session to network session. Thus, a rule in existing system that relies on network addresses may not work when the network address changes. Using the techniques of the disclosure, a client device 148 can be identified regardless of the network address in use at any particular time.

Moreover, the techniques of the disclosure provide an advantage over existing system in that ACLs may be removed when no longer needed. For example, when a client device 148 disconnects from the network, the ACE and/or ACLs associated with the client device may be removed from firewalls 114, switches 146, APs 142 and/or routers 147, thereby freeing memory resources for other ACLs or other purposes.

Although the techniques of the present disclosure are described in this example as performed by NAC systems 180, NMS 130, and/or firewall 114, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NAC systems 180, NMS 130, or firewall 114, or may be distributed throughout network 100, and may or may not form a part of NAS systems 180, NMS 130 and/or firewall 114.

Figure 1B:
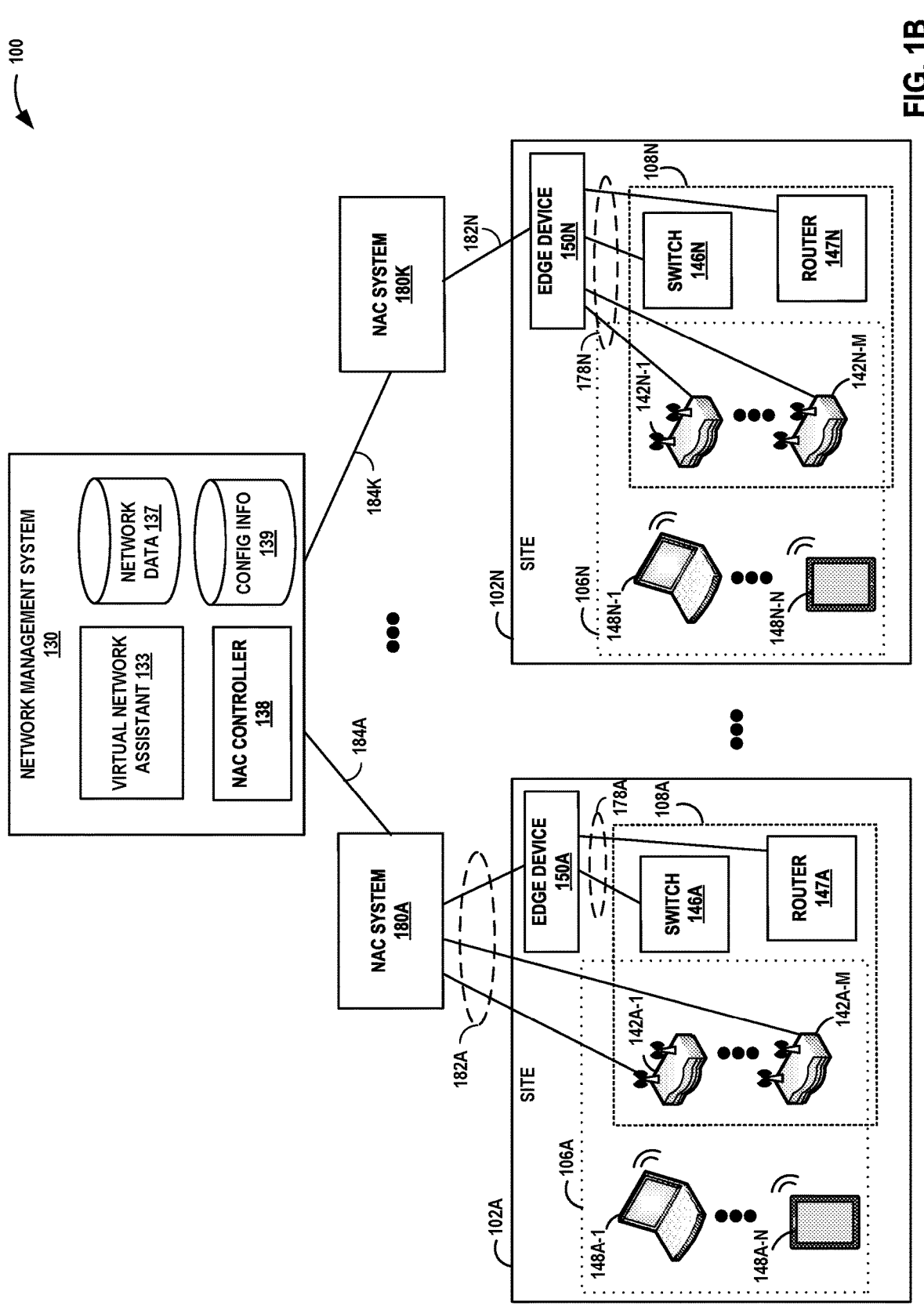
FIG. 1B is a block diagram illustrating further example details of the network system of FIG. 1A.

FIG. 1B is a block diagram illustrating further example details of the network system of FIG. 1A. In this example, FIG. 1B illustrates logical connections 178A-178N, 182A-182N, and 184A-184K, between NAS devices 108 at sites 102, NAC systems 180, and NMS 130. In addition, FIG. 1B illustrates NMS 130 configured to operate according to an AI-based computing platform to provide configuration and management of one or more of NAC systems 180 and NAS devices 108 at sites 102 via the logical connections.

In operation, NMS 130 observes, collects and/or receives network data 137, which may take the form of data extracted from messages, counters, and statistics, for example, from one or more of APs 142, switches 146, routers 147, edge devices 150, NAC systems 180, and/or other nodes within network 134. NMS 130 provides a management plane for network 100, including management of enterprise-specific configuration information 139 for one or more of NAS devices 108 at sites 102 and NAC systems 180. Each of the one or more NAS devices 108 and NAC systems 180 may have a secure connection with NMS 130, e.g., a RadSec (RADIUS over Transport Layer Security (TLS)) tunnel or another encrypted tunnel. Each of the NAS devices 108 and NAC systems 180 may download the appropriate enterprise-specific configuration information 139 from NMS 130 and enforce the configuration. In some scenarios, one or more of the NAS devices 108 may be a third-party device or otherwise not support establishment of a secure connection directly with NMS 130. In these scenarios, edge devices 150 may provide proxies through which the NAS devices 108 may connect to NMS 130.

In accordance with one specific implementation, a computing device is part of NMS 130. In accordance with other implementations, NMS 130 may comprise one or more computing devices, dedicated servers, virtual machines, containers, services, or other forms of environments for performing the techniques described herein. Similarly, computational resources and components implementing virtual network assistant (VNA) 133 and/or NAC controller 138, may be part of the NMS 130, may execute on other servers or execution environments, or may be distributed to nodes within network 134 (e.g., routers, switches, controllers, gateways, and the like).

In some examples, NMS 130 monitors network data 137, e.g., one or more service level expectation (SLE) metrics, received from each site 102A-102N, and manages network resources, such as the one or more of APs 142, switches 146, routers 147, and edge devices 150 at each site, to deliver a high-quality wireless experience to end users, IoT devices and clients at the site. In other examples, NMS 130 monitors network data 137 received from NAC systems 180 and manages enterprise-specific configuration information 139 for NAC systems 180 to enable unconstrained network access control services for client devices 148 at sites 102 with low latency and high availability.

As illustrated in FIG. 1B, NMS 130 may include VNA 133 that implements an event processing platform for providing real-time insights and simplified troubleshooting for IT operations, and that automatically takes corrective action or provides recommendations to proactively address network issues. VNA 133 may, for example, include an event processing platform configured to process hundreds or thousands of concurrent streams of network data 137 from sensors and/or agents associated with APs 142, switches 146, routers 147, edge devices 150, NAC systems 180, and/or other nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify a site or network administrator via admin device 111 of any predicted events, anomalies, trends, and may perform root cause analysis and automated or assisted error remediation. In some examples, VNA 133 of NMS 130 may apply machine learning techniques to identify the root cause of error conditions detected or predicted from the streams of network data 137. If the root cause may be automatically resolved, VNA 133 may invoke one or more corrective actions to correct the root cause of the error condition, thus automatically improving the underlying SLE metrics and also automatically improving the user experience.

Further example details of operations implemented by the VNA 133 of NMS 130 are described in U.S. Pat. No. 9,832,082, issued Nov. 28, 2017, and entitled "Monitoring Wireless Access Point Events," U.S. Publication No. US 2021/0306201, published Sep. 30, 2021, and entitled "Network System Fault Resolution Using a Machine Learning Model," U.S. Pat. No. 10,985,969, issued Apr. 20, 2021, and entitled "Systems and Methods for a Virtual Network Assistant," U.S. Pat. No. 10,958,585, issued Mar. 23, 2021, and entitled "Methods and Apparatus for Facilitating Fault Detection and/or Predictive Fault Detection," U.S. Pat. No. 10,958,537, issued Mar. 23, 2021, and entitled "Method for Spatio-Temporal Modeling," and U.S. Pat. No. 10,862,742, issued Dec. 8, 2020, and entitled "Method for Conveying AP Error Codes Over BLE Advertisements," all of which are incorporated herein by reference in their entirety.

In addition, as illustrated in FIG. 1B, NMS 130 may include a NAC controller 138 that implements a NAC configuration platform that provides a user interface to create and assign access policies for client devices 148 of enterprise wireless networks 106, and provides the appropriate enterprise-specific configuration information 139 to the respective NAC clouds 180A-180K. NMS 130 may have a secure connection 184A-184K, e.g., a RadSec tunnel or another encrypted tunnel, with each of NAC systems 180A-180K, respectively. Through secure connections 184, NAC controller 136 may receive network data 137, e.g., NAC event data, from each of NAC systems 180 and each of NAC systems 180 may download the appropriate configuration information 139 from NMS 130. In some examples, NAC controller 138 may log or map which enterprise networks are served by which of NAC systems 180. In addition, NAC controller 138 may monitor NAC systems 180 to identify failures of primary NAC systems and manage failovers to standby NAC systems.

NAC systems 180 provide network access control services in a control plane for one or more of NAS devices 108 at sites 102. In operation, NAC systems 180 authenticate client devices 148 to access enterprise wireless networks 106 and may perform fingerprinting to identify the client devices 148 and apply authorizations or access polices to the client devices 148 based on the identities. NAC systems 180 include multiple, geographically distributed points of presence. For example, NAC system 180A may comprise a first cloud-based system positioned within a first geographic region, e.g., U.S. East, NAC system 180B (not shown) may comprise a second cloud-based system positioned within a second geographic region, e.g., U.S. West, and NAC system 180K may comprise a k$^{th}$ cloud-based system positioned within a k$^{th}$ geographic region, e.g., China.

Deploying multiple NAC clouds at several geographic regions enables network access control services to be offered to nearby NAS devices with lower latency and high availability, while avoiding the processing limitations and maintenance issues experienced by on-premises NAC appliances. For example, NAS devices 108A within enterprise network site 102A may connect to the physically closest one of NAC systems, i.e., NAC system 180A, to experience lower latency for network access control services. In some examples, the physically closest one of NAC systems 180 may comprise a primary NAC system, and the NAS devices may also connect to a next closest one of NAC systems 180 as a standby NAC system in case of a failure of the primary NAC system. For example, NAS devices 108A within enterprise network site 102A may connect to both NAC system 180A and NAC system 108B (not shown), to experience high availability of network access control services.

In the example illustrated in FIG. 1B, each of NAS devices 108, directly or indirectly, has a secure connection with at least one of NAC systems 180 or NMS 130. For example, each of APs 142A within site 120A has a direct, secure connection 182A to NAC system 180A, e.g., a RadSec tunnel or another encrypted tunnel. Each of switch 146A and router 147A within site 120A has an indirect connection to NAC system 180A via edge device 150A. In this example, switch 146A and router 147A may not support establishment of a secure connection directly with NAC system 180A, but edge device 150A may provide a proxy through which switch 146A and router 147A may connect to NAC system 180A. For example, each of switch 146A and router 147A have a direct connection 178A, e.g., a RADIUS tunnel, to edge device 150A, and edge device 150A has a direct, secure connection 182A to NAC system 180A. Similarly, for site 102N, each of NAS devices 108N has an indirect connection to NAC system 180K via edge device 150N. In this example, APs 142N, switch 142N, and router 147N may not support establishment of a secure connection directly with NAC system 180K, but edge device 150N may provide a proxy through which NAS devices 108N may connect to NAC system 180K. For example, each of APs 142N, switch 146N, and router 147N have a direct connection 178N, e.g., a RADIUS tunnel, to edge device 150N, and edge device 150N has a direct, secure connection 182N to NAC system 180K.

Through secure connections 182, NAC systems 180 may receive network access requests from client devices 148 through NAS devices 108 (and in some cases edge devices 150) at nearby enterprise sites 102. In response to the network access requests, NAC systems 180 authenticate the requesting client devices using an AAA server. NAC system 180 may perform fingerprinting to identify the authenticated client devices. NAC systems 180 then enforce the appropriate access policies on the identities of the authenticated client devices per the enterprise-specific configuration information 139 downloaded from NMS 130. In accordance with one specific implementation, a computing device is part of each of NAC systems 180. In accordance with other implementations, each of NAC systems 180A-180K may comprise one or more computing devices, dedicated servers, virtual machines, containers, services, or other forms of environments for performing the techniques described herein.

Figure 2:
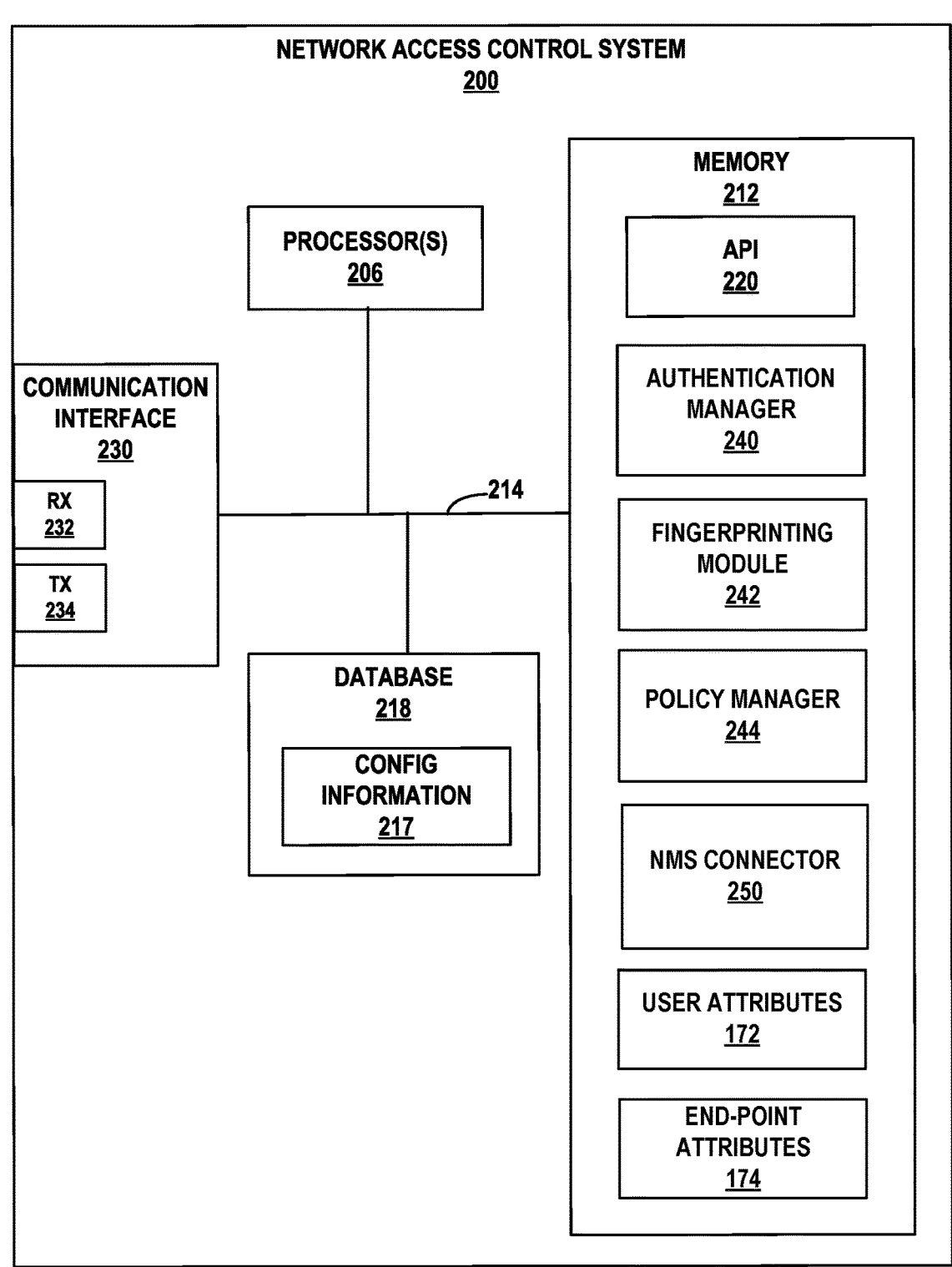
FIG. 2 is a block diagram of an example network access control system, in accordance with one or more techniques of this disclosure.

FIG. 2 is a block diagram of an example network access control (NAC) system 200, in accordance with one or more techniques of the disclosure. NAC system 200 may be used to implement, for example, any of NAC systems 180 in FIGS. 1A, 1B. In such examples, NAC system 200 is responsible for authenticating and authorizing one or more client devices 148 to access enterprise wireless networks 106 at a sub-set of nearby enterprise sites 102A-102N.

NAC system 200 includes a communications interface 230, one or more processor(s) 206, a user interface 210, a memory 212, and a database 218. The various elements are coupled together via a bus 214 over which the various elements may exchange data and information. In some examples, NAC system 200 receives network access requests from one or more of client devices 148 through NAS devices 108 (and in some cases edge devices 150) at the sub-set of nearby enterprise sites 102 from FIGS. 1A, 1B. In response to the network access requests, NAC system 200 authenticates the requesting client devices. In some examples, NAC system 200 enforces appropriate access policies on the authenticated client devices in accordance with enterprise-specific configuration information 217 downloaded from NMS 130 from FIGS. 1A, 1B. In some examples, NAC system 200 may be part of another server shown in FIGS. 1A, 1B or a part of any other server.

Processor(s) 206 execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 230 may include, for example, an Ethernet interface. Communications interface 230 couples NAC system 200 to a network and/or the Internet, such as any of network 134 as shown in FIG. 1A and/or any local area networks. Communications interface 230 includes a receiver 232 and a transmitter 234 by which NAC system 200 receives/transmits data and information to/from any of APs 142, switches 146, routers 147, edge devices 150, NMS 130, or servers 116, 122, 128 and/or any other network nodes, devices, or systems forming part of network system 100 such as shown in FIGS. 1A, 1B.

The data and information received by NAC system 200 may include, for example, configuration information 217 associated with one or more of enterprise sites 102 that is downloaded from NMS 130. Configuration information 217 may include enterprise-specific NAC configuration information, including security policies (e.g., security policy 175 of FIG. 1, access policies and associated policy assignment criteria. For example, configuration information 217 may define certain virtual local area networks (VLANs), access control lists (ACLs), registration portals, or the like, associated with certain categories of client devices. Configuration information 217 may further define, for each of the different categories of the client devices, different types of tracking, different types of authorization, and/or different levels of access privileges. In addition, the data and information received by NAC system 200 may include identification information of client devices 148 (e.g., endpoint attributes 174) from NAS devices 108 that is used by NAC system 200 to perform fingerprinting of the end user devices in order to enforce the access policies as defined in configuration information 217. NAC system 200 may further transmit data and information via communications interface 230 to NMS 130 including, for example, NAC event data, which may be used by NMS 130 to remotely monitor the performance of NAC system 200.

Memory 212 includes one or more devices configured to store programming modules and/or data associated with operation of NAC system 200. For example, memory 212 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 includes an API 220, an authentication manager 240, a fingerprinting module 240, a policy manager 244, and an NMS connector 250. NAC system 200 may also include any other programmed modules, software engines and/or interfaces configured for authentication and authorization of client devices 148.

NMS connector 250 manages the data and information exchanged between NAC system 200 and NMS 130, e.g., via a RadSec tunnel or another encrypted tunnel 184, as shown in FIG. 1B. NMS connector 250 may maintain a log or mapping of which enterprise networks are served by NAC system 200 and the corresponding configuration information 217 for those enterprises. NMS connector 250 may also manage any updates or modifications to configuration information 217 received from NMS 130.

Authentication manager 240 enables authentication of client devices 148 at NAS devices 108 to access wireless networks 106, such as branch or campus enterprise networks, at the sub-set of enterprise sites 102 in communication with NAC system 200. Authentication manager 240 may perform the functionality of an AAA server, e.g., a RADIUS server, or provide access to an AAA server to authenticate client devices 148 prior to providing access to the enterprise networks 106 via the NAS devices 108. In some examples, authentication manager 240 may participate in a handshake exchange between a client device, an NAS device, and NAC system 200 controlling access at the NAS device. In other examples, authentication manager 240 may enable certificate-based authentication of client devices or enable interaction with cloud directory services to authenticate the client devices. In some aspects, information obtained by authentication manager may be incorporated int user attributes 172. For example, authentication manager 240 may obtain information for active directory server 112 or RADIUS server 113 of FIG. 1 and include such information in user attributes 172.

Fingerprinting module 242 enables identification of client devices 148 used to provide the client devices with appropriate authorizations or access policies based on their identities or categorizations. Fingerprinting module 242 may identify client devices 148 by analyzing network behavior of the client devices. Fingerprinting module 242 may receive the network behavior data of the client devices from the NAS devices 108 and/or edge devices 150 in communication with NAS system 200. For example, fingerprinting module 242 may perform fingerprinting of client devices 148 based on one or more of MAC addresses, DHCP options used to request IP addresses, LLDP packets, user agent information, and/or device type and operating system information. Fingerprinting module 242 may user such information to determine a digital fingerprint of a client device. The digital fingerprint (or an identifier associated with the digital fingerprint) may be provided to firewall 114 for use in applying rules of security policy 175.

In some aspects, fingerprinting module 242 may perform the fingerprinting of client devices 148. In some aspects, fingerprinting module 242 may provide endpoint attributes 174 to an external fingerprinting service (e.g., a fingerprinting service provided by NMS 130 or on a server 128 of FIG. 1A). The external fingerprinting service can respond with the digital fingerprint associated the endpoint attributes 174.

Policy manager 244 enables enforcement of the authorizations or access policies based on the identities or categorizations of the authenticated client devices. For example, policy manager 244 may assign the authenticated client devices to certain VLANs, apply certain ACLs, direct the client devices to certain registration portals, or the like, that are each associated with different types of tracking, different types of authorization, and/or different levels of access privileges in accordance with configuration information 217 for the corresponding enterprise of the client devices. In some examples, after a client device gains access to the enterprise network, policy manger 244 may monitor activities of the client device to identify security concerns and, in response, re-assign the client device to a quarantine VLAN or another less privileged VLAN to restrict access of the client device.

API 220 an provide an interface for other network devices to utilize services or information provided by NAC system 200. For example, firewall 114 may maintain security policies 175 in addition to, or instead of NAC system 200 (or NMS 130). Firewall 114, or other security enforcement entities, can utilize API 220 to retrieve endpoint attributes 174 and user attributes 172 when a client device connects to the network. Firewall 114 can interpret the security policy 175 using the endpoint attributes 174 and user attributes 172 to generate ACLs 252 in the same way as discussed above with respect to NAC system 180. As an example, API 220 may provide a subscription interface that enables firewall 114 to subscribe to updates from NAC system 200. Such updates can include notifications when a user connects to network system 100 and/or when a user disconnects from network system 100.

Figure 3:
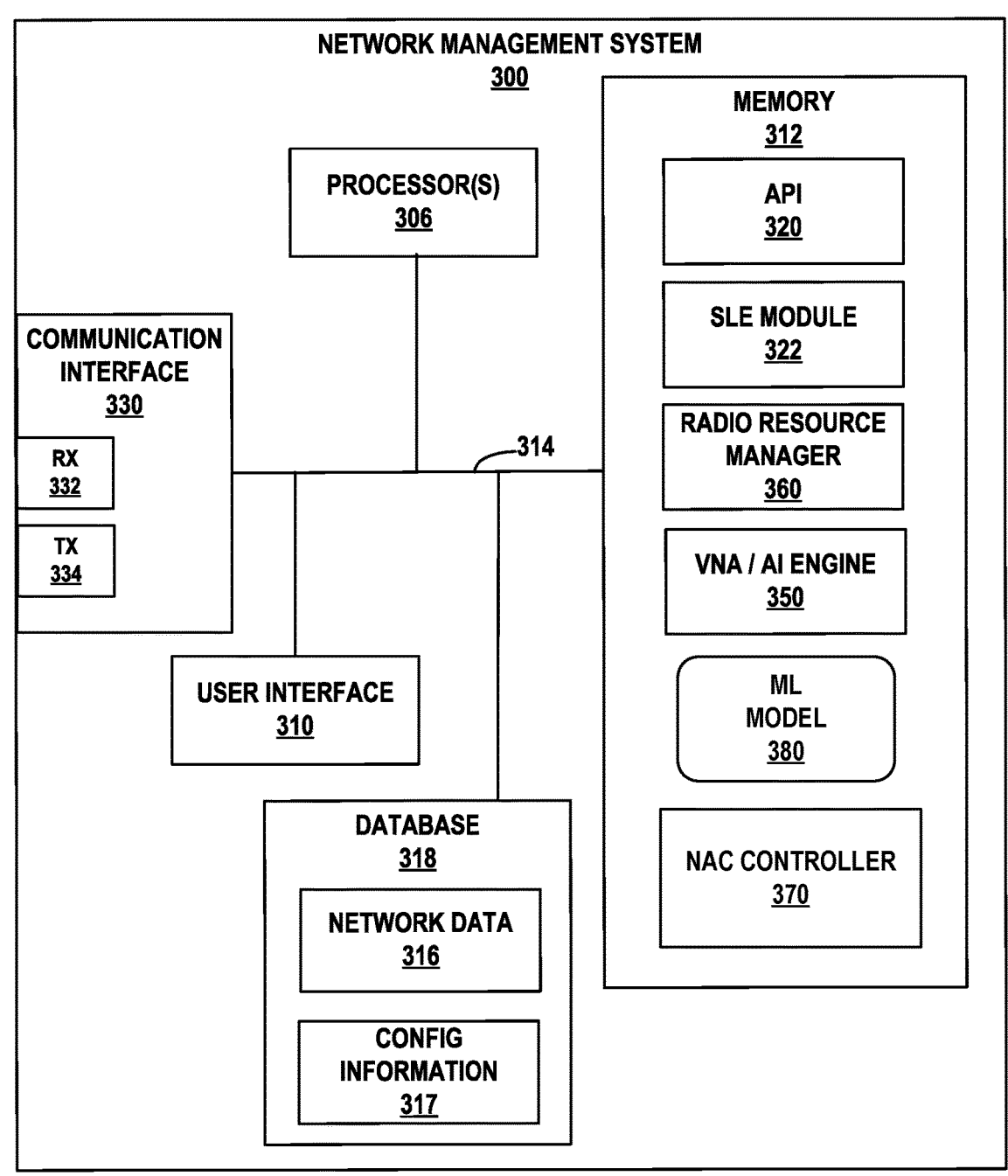
FIG. 3 is a block diagram of an example network management system, in accordance with one or more techniques of the disclosure.

FIG. 3 is a block diagram of an example network management system (NMS) 300, in accordance with one or more techniques of the disclosure. NMS 300 may be used to implement, for example, NMS 130 in FIGS. 1A, 1B. In such examples, NMS 300 is responsible for monitoring and management of one or more wireless networks 106A-106N at sites 102A-102N, respectively.

NMS 300 includes a communications interface 330, one or more processor(s) 306, a user interface 310, a memory 312, and a database 318. The various elements are coupled together via a bus 314 over which the various elements may exchange data and information. In some examples, NMS 300 receives data from one or more of client devices 148, APs 142, switches 146, routers, 147, edge devices 150, NAC systems 180, and other network nodes within network 134, e.g., routers and gateway devices, which may be used to calculate one or more SLE metrics and/or update network data 316 in database 318. NMS 300 analyzes this data for cloud-based management of wireless networks 106A-106N. In some examples, NMS 300 may be part of another server shown in FIG. 1A or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of client devices 148, APs 142, switches 146, routers 147, edge devices 150, NAC systems 180, servers 116, 122, 128 and/or any other network nodes, devices, or systems forming part of network system 100 such as shown in FIG. 1A. In some scenarios described herein in which network system 100 includes "third-party" network devices that are owned and/ or associated with different entities than NMS 300, NMS 300 does not directly receive, collect, or otherwise have access to network data from the third-party network devices. In some examples, an edge device, such as edge devices 150 from FIGS. 1A, 1B, may provide a proxy through which the network data of the third-party network devices may be reported to NMS 300.

The data and information received by NMS 300 may include, for example, telemetry data, SLE-related data, or event data received from one or more of client devices 148, APs 142, firewalls 114, switches 146, routers 147, edge devices 150, NAC systems 180, or other network nodes, e.g., routers and gateway devices, used by NMS 300 to remotely monitor the performance of wireless networks 106A-106N and application sessions from client device to cloud-based application server. NMS 300 may further transmit data via communications interface 330 to any of the network devices, such as client devices 148, APs 142, firewalls 114, switches 146, routers 147, edge devices 150, NAC systems 180, or other network nodes within network 134, to remotely manage wireless networks 106A-106N and portions of the wired network.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, an SLE module 322, a virtual network assistant (VNA)/AI engine 350, a radio resource management (RRM) engine 360, and a NAC controller 370. NMS 300 may also include any other programmed modules, software engines and/or interfaces configured for remote monitoring and management of wireless networks 106A-106N and portions of the wired network, including remote monitoring and management of any of APs 142, firewalls 114, switches 146, routers 147, edge devices 150, NAC systems 180, or other network devices, e.g., routers and gateway devices.

SLE module 322 enables set up and tracking of thresholds for SLE metrics for each network 106A-106N. SLE module 322 further analyzes SLE-related data collected by, e.g., APs, such as any of APs 142 from UEs in each wireless network 106A-106N. For example, APs 142A-1 through 142A-N collect SLE-related data from client devices 148A-1 through 148A-N currently connected to wireless network 106A. This data is transmitted to NMS 300, which executes by SLE module 322 to determine one or more SLE metrics for each client device 148A-1 through 148A-N currently connected to wireless network 106A. This data, in addition to any network data collected by one or more APs 142A-1 through 142A-N in wireless network 106A, is transmitted to NMS 300 and stored as, for example, network data 316 in database 318.

RRM engine 360 monitors one or more metrics for each site 102A-102N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 102 with an aim to improve the coverage and capacity SLE metrics and thus to provide an improved wireless experience for the user.

VNA/AI engine 350 analyzes data received from network devices as well as its own data to identify when undesired to abnormal states are encountered at one of the network devices. For example, VNA/AI engine 350 may identify the root cause of any undesired or abnormal states, e.g., any poor SLE metric(s) indicative of connected issues at one or more network devices. In addition, VNA/AI engine 350 may automatically invoke one or more corrective actions intended to address the identified root cause(s) of one or more poor SLE metrics. In some examples, ML model 380 may comprise a supervised ML model that is trained, using training data comprising pre-collected, labeled network data received from the network devices. The supervised ML model may comprise one of a logistical regression, naïve Bayesian, support vector machine (SVM), or the like. In other examples, ML model 380 may comprise an unsupervised ML model. Although not shown in FIG. 3, in some examples, database 318 may store the training data and VNA/AI engine 350 or a dedicated training module may be configured to train ML model 380 based on the training data to determine appropriate weights across the one or more features of the training data.

Examples of corrective actions that may be automatically invoked by VNA/AI engine 350 may include, but are not limited to, invoking RRM 360 to reboot one or more APs, adjusting/modifying the transmit power of a specific radio in a specific AP, adding S SID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel, e.g., a site or network administrator using admin device 111, to address the network error.

NAC controller 370 implements a NAC configuration platform that provides user interface 310 for display to an enterprise network administrator, e.g., via admin device 111 of FIG. 1A, through which to receive access policy information for the enterprise network. NAC controller 370 creates enterprise-specific configuration information 317 stored in database 318 based on the input received via user interface 310. Configuration information 317 may include NAC configuration information for one or more enterprise networks managed by NMS 300. For each enterprise, configuration information 317 may including security policies (e.g., security policy 175), access policies and associated policy assignment criteria. For example, configuration information 317 may define certain VLANs, ACLs, registration portals, or the like, associated with certain categories of client devices, and may further define, for each of the different categories of the client devices, different types of tracking, different types of authorization, and/or different levels of access privileges. Configuration information 317 may be substantially similar to configuration information 139 of FIG. 1B.

NAC controller 370 manages the data and information exchanged between NMS 300 and NAC systems 180, e.g., via RadSec tunnels or another encrypted tunnels 184, as shown in FIG. 1B. NAC controller 370 may maintain a log or mapping of which enterprise networks are served by which of NAC systems 180 and the corresponding configuration information 317 for those enterprises. NAC controller 370 may also manage any updates or modifications to configuration information 317 to be pushed down to NAC systems 180. In addition, NAC controller 370 may monitor NAC systems 180 to identify failures of primary NAC systems and manage failovers to standby NAC systems.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 4:
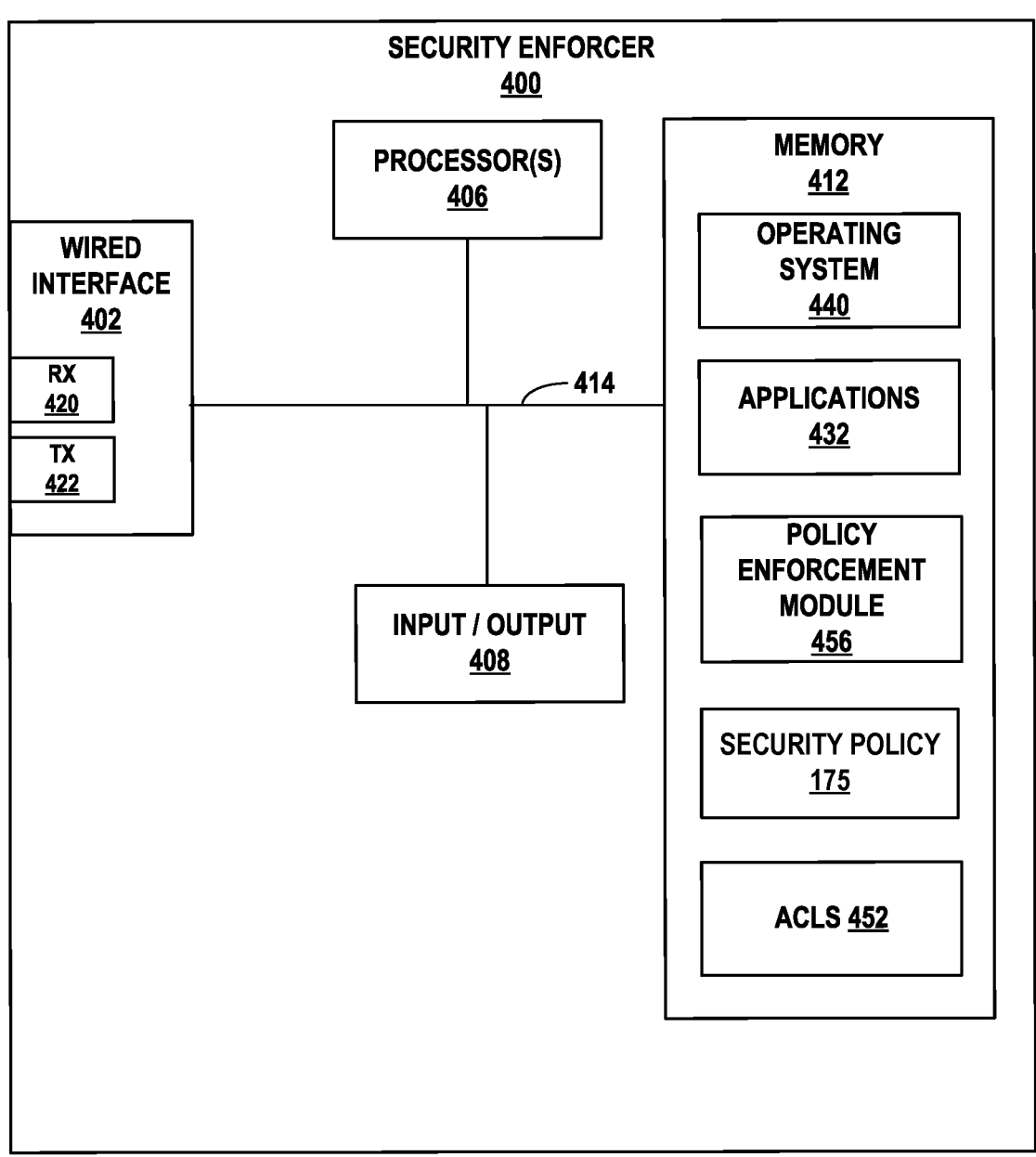
FIG. 4 is a block diagram of an example security enforcer, in accordance with one or more techniques of the disclosure.

FIG. 4 is a block diagram of an example security enforcer 400, in accordance with one or more techniques of the disclosure. Security enforcer 400 may, in some examples, be implemented by a firewall 114 of FIG. 1A. In this example, security enforcer 400 includes a communications interface 402, e.g., an Ethernet interface, a processor 406, input/output 408, e.g., display, buttons, keyboard, keypad, touch screen, mouse, etc., a memory 412 and other assemblies of components e.g., assembly of hardware module, e.g., assembly of circuits, coupled together via a bus 414 over which the various elements may interchange data and information. Communications interface 402 couples security enforcer 400 to a network, such as an enterprise network.

Though only one interface is shown by way of example, those skilled in the art should recognize that network nodes may have multiple communication interfaces. Communications interface 402 includes a receiver 420 via which security enforcer 400 can receive packets to be forwarded to a destination node. Communications interface 402 includes a transmitter 422, via which the security enforcer 400 can transmit packets to be forwarded to a destination node, if such transmission complies with security policy 175.

Memory 412 stores executable software applications 432, operating system 440 policy enforcement module 456, security policy 175, and ACLs 252. Access control module 456 may enforce a security policy 175 (FIG. 1A). For example, policy enforcement module 456 may receive ACLs 252 that are generated to implement security policy 175 and received from NAC systems 180.

Policy enforcement module 456 can apply security policy 175 to user attributes 172 and endpoint attributes 174 to generate ACLs 252. Policy enforcement module 456 can generate ACLs 252 in various ways. In some examples, policy manager 244 may add the ACEs associated with a client device 148 and to an existing ACL of ACLs 252, and provide the complete ACL to the network device. In cases where a network device supports multiple ACLs, policy enforcement module 456 may provide a new ACL to the network device that is added to the set of existing ACLs on the device.

In some aspects, policy enforcement module 456 may associate an identifier (e.g., a network session identifier or a client device identifier) with ACEs that are associated with a client device 148 and generated by policy enforcement module 456. When the client device 148 disconnects from the network (e.g., ends a network session), policy enforcement module 456 may use the identifier to locate ACEs that are associated with the client device 148. Policy enforcement module 456 may remove the identified ACEs from an ACL. For example, policy enforcement module 456 may remove ACEs from an ACL associated with the client device, and provide the updated ACL to the network device. In cases where the network device supports multiple ACLs, policy enforcement module 456 may delete the ACL associated with client device 148 from the network device.

Figure 5:
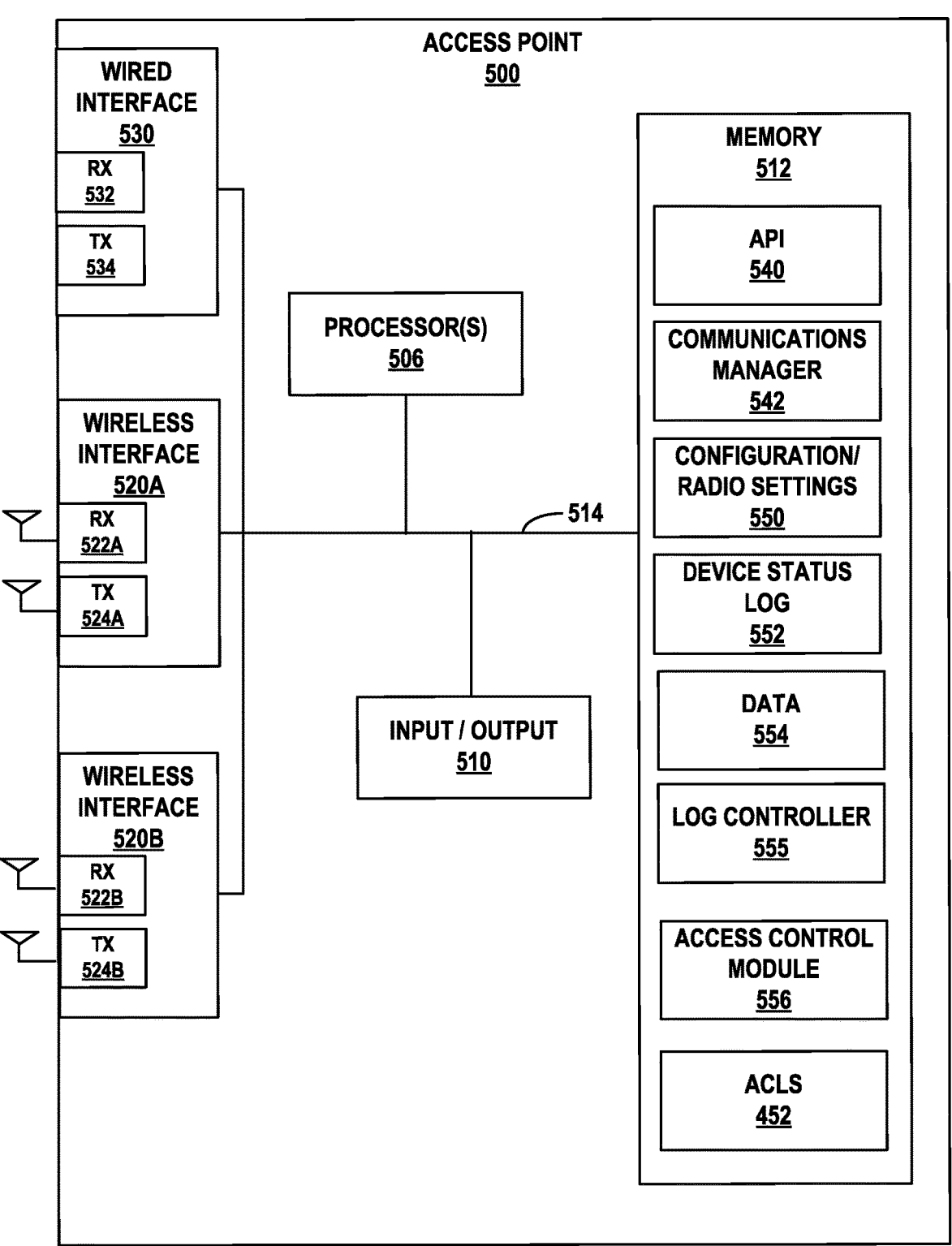
FIG. 5 is a block diagram of an example access point device, in accordance with one or more techniques of this disclosure.

FIG. 5 is a block diagram of an example access point (AP) device 500, in accordance with one or more techniques of this disclosure. Example access point 500 shown in FIG. 5 may be used to implement any of APs 142 as shown and described herein with respect to FIG. 1A. Access point 500 may comprise, for example, a Wi-Fi, Bluetooth and/or Bluetooth Low Energy (BLE) base station or any other type of wireless access point.

In the example of FIG. 5, access point 500 includes a wired interface 530, wireless interfaces 520A-420B one or more processor(s) 506, memory 512, and input/output 510, coupled together via a bus 514 over which the various elements may exchange data and information. Wired interface 530 represents a physical network interface and includes a receiver 532 and a transmitter 534 for sending and receiving network communications, e.g., packets. Wired interface 530 couples, either directly or indirectly, access point 500 to a wired network device, such as one of switches 146 or routers 147 of FIGS. 1A, 1B, within the wired network via a cable, such as an Ethernet cable.

First and second wireless interfaces 520A and 520B represent wireless network interfaces and include receivers 522A and 522B, respectively, each including a receive antenna via which access point 500 may receive wireless signals from wireless communications devices, such as client devices 148 of FIGS. 1A, 1B. First and second wireless interfaces 520A and 520B further include transmitters 524A and 524B, respectively, each including transmit antennas via which access point 500 may transmit wireless signals to wireless communications devices, such as client devices 148 of FIGS. 1A, 1B. In some examples, first wireless interface 520A may include a Wi-Fi 802.11 interface (e.g., 2.4 GHz and/or 5 GHz) and second wireless interface 520B may include a Bluetooth interface and/or a Bluetooth Low Energy (BLE) interface. As described above, AP 500 may request network access for one or more client devices 148 from a nearby NAC system, e.g., NAC system 200 of FIG. 2 or one of NAC systems 180 of FIGS. 1A, 1B.

Processor(s) 506 are programmable hardware-based processors configured to execute software instructions, such as those used to define a software or computer program, stored to a computer-readable storage medium (such as memory 512), such as non-transitory computer-readable mediums including a storage device (e.g., a disk drive, or an optical drive) or a memory (such as Flash memory or RAM) or any other type of volatile or non-volatile memory, that stores instructions to cause the one or more processors 506 to perform the techniques described herein.

Memory 512 includes one or more devices configured to store programming modules and/or data associated with operation of access point 500. For example, memory 512 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 506 to perform the techniques described herein.

In this example, memory 512 stores executable software including an application programming interface (API) 540, a communications manager 542, configuration settings 550, a device status log 552, data storage 554, log controller 555, access control module 556, and ACLs 452. Device status log 552 includes a list of events specific to access point 500. The events may include a log of both normal events and error events such as, for example, memory status, reboot or restart events, crash events, cloud disconnect with self-recovery events, low link speed or link speed flapping events, Ethernet port status, Ethernet interface packet errors, upgrade failure events, firmware upgrade events, configuration changes, etc., as well as a time and date stamp for each event. Log controller 555 determines a logging level for the device based on instructions from NMS 130. Data 554 may store any data used and/or generated by access point 500, including data collected from client devices 148, such as data used to calculate one or more SLE metrics, that is transmitted by access point 500 for cloud-based management of wireless networks 106A by NMS 130/300.

Input/output (I/O) 510 represents physical hardware components that enable interaction with a user, such as buttons, a display, and the like. Although not shown, memory 512 typically stores executable software for controlling a user interface with respect to input received via I/O 510. Communications manager 542 includes program code that, when executed by processor(s) 506, allow access point 500 to communicate with client devices 148 and/or network(s) 134 via any of interface(s) 530 and/or 520A-420C. Configuration settings 550 include any device settings for access point 500 such as radio settings for each of wireless interface(s) 520A-420C. These settings may be configured manually or may be remotely monitored and managed by NMS 130 to optimize wireless network performance on a periodic (e.g., hourly or daily) basis.

As described herein, AP device 500 may measure and report network data from status log 552 to NMS 130. The network data may comprise event data, telemetry data, and/or other SLE-related data. The network data may include various parameters indicative of the performance and/or status of the wireless network. The parameters may be measured and/or determined by one or more of the UE devices and/or by one or more of the APs in a wireless network. NMS 130/300 may determine one or more SLE metrics based on the SLE-related data received from the APs in the wireless network and store the SLE metrics as network data 137 (FIG. 1B).

Access control module 556 may enforce a security policy 175 (FIG. 1A). For example, access control module 556 may receive ACLs 452 that are generated to implement security policy 175 and received from security enforcer 400 (e.g., a firewall 114). Access control module 556 may apply ACLs 452 to network traffic sent and received by AP device 500 via interfaces 522, 524, 532 and 534.

Figure 6:
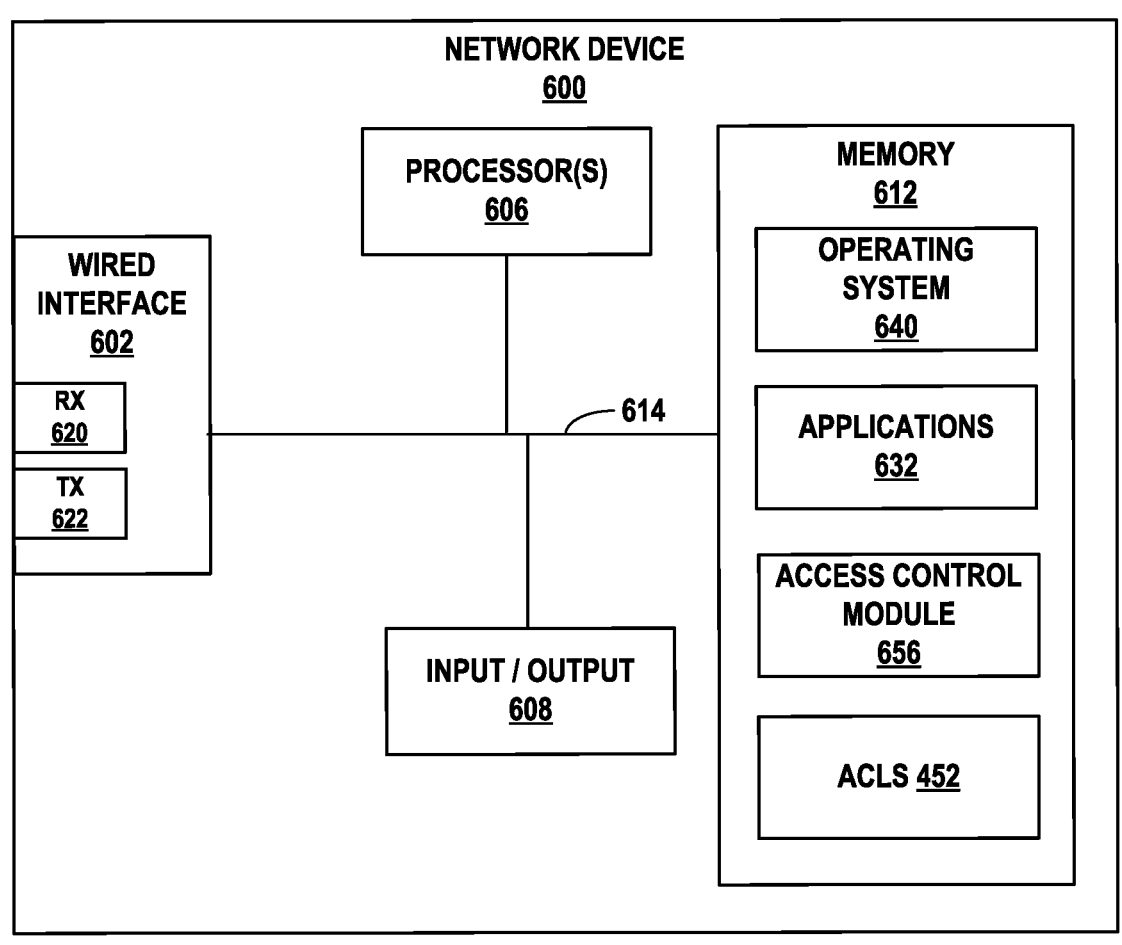
FIG. 6 is a block diagram of an example network device, in accordance with one or more techniques of this disclosure.

FIG. 6 is a block diagram illustrating an example network node (or server) 600 configured according to the techniques described herein. In one or more examples, the network node 600 implements a device or a server attached to the network 134 of FIGS. 1A and 1B, e.g., router, switch, AAA server, DHCP server, DNS server, VNA, Web server, etc., or a network device such as, e.g., routers, switches or the like. In some embodiments, network node 600 of FIG. 6 is switch 146 or a router 147.

In this example, network node 600 includes a communications interface 602, e.g., an Ethernet interface, a processor 606, input/output 608, e.g., display, buttons, keyboard, keypad, touch screen, mouse, etc., a memory 612 and assemblies of components, e.g., assembly of hardware module, e.g., assembly of circuits, coupled together via a bus 614 over which the various elements may interchange data and information. Communications interface 602 couples the network node 600 to a network, such as an enterprise network.

Though only one interface is shown by way of example, those skilled in the art should recognize that network nodes may have multiple communication interfaces. Communications interface 602 includes a receiver 620 via which the network node 600, e.g., a switch or router can receive packets to be forwarded to a destination node. Communications interface 602 includes a transmitter 622, via which the network node 600, e.g., a switch or router, can transmit packets to be forwarded to a destination node.

Memory 612 stores executable software applications 632, operating system 640 access control module 656 and ACLs 252. Access control module 656 may enforce a security policy 175 (FIG. 1A). For example, access control module 656 may receive ACLs 452 that are generated to implement security policy 175 and received from security enforcer 400 (e.g., a firewall 114). Access control module 656 may apply ACLs 452 to network traffic sent and received by network device 600 via interfaces 620 and 622.

Figure 7:
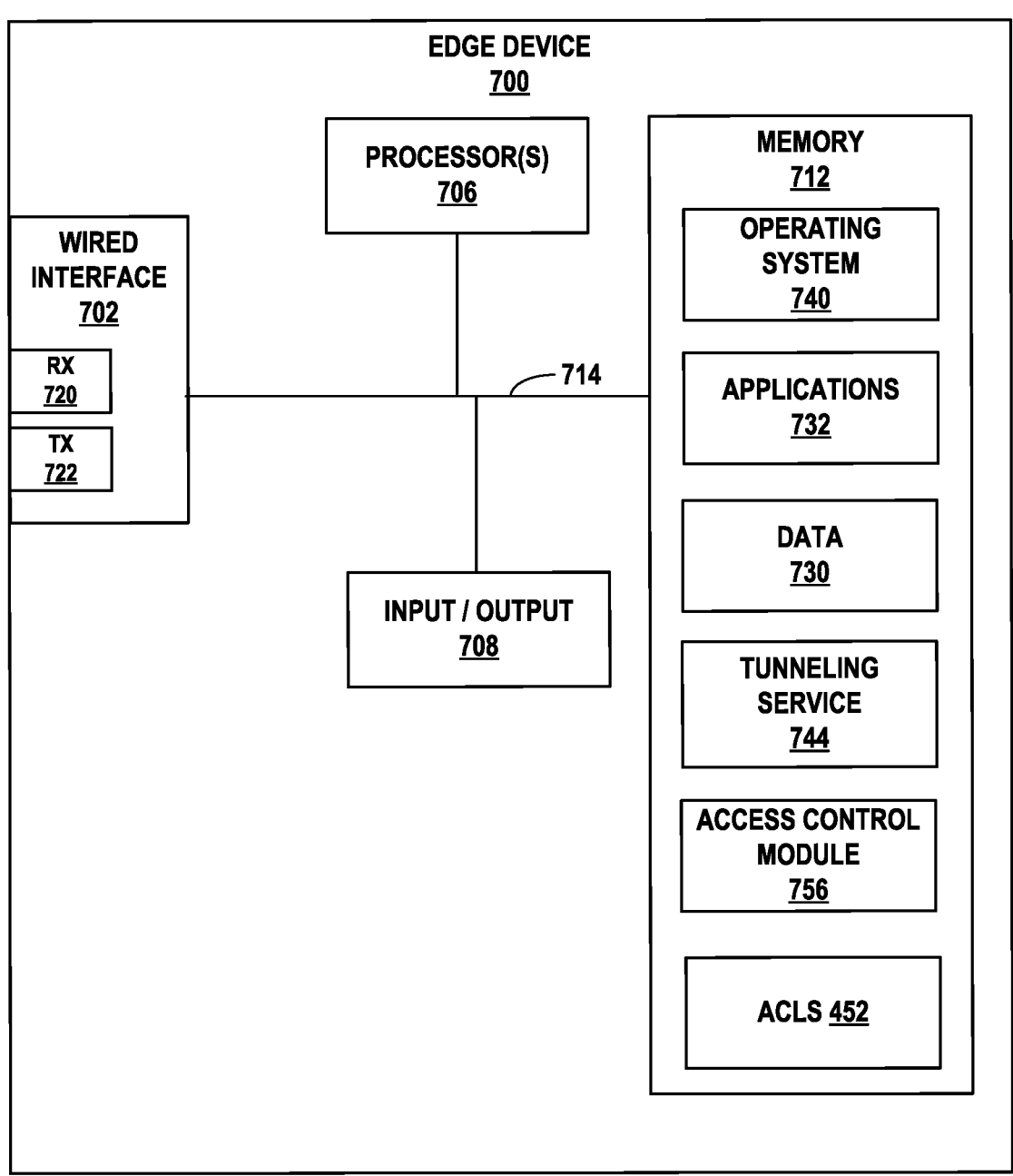
FIG. 7 is a block diagram of an example edge device, in accordance with one or more techniques of this disclosure.

FIG. 7 is a block diagram illustrating an example edge device 700, in accordance with one or more techniques of this disclosure. Edge device 700 comprises a cloud-managed, wireless local area network (LAN) controller. Edge device 700 may be used to implement, for example, any of edge devices 150 in FIGS. 1A, 1B. In such examples, edge device 700 comprises an on-premises device at a site 102 that is in communication with NMS 130 and one or more on-premises NAS devices 108, e.g., one or more APs 142, switches 146, or routers 147, from FIGS. 1A, 1B. Edge device 700 with NMS 130 and may operate to extend certain microservices from NMS 130 to the on-premises NAS devices 108 while using NMS 130 and its distributed software architecture for scalable and resilient operations, management, troubleshooting, and analytics.

In this example, edge device 700 includes a wired interface 702, e.g., an Ethernet interface, a processor 706, input/output 708, e.g., display, buttons, keyboard, keypad, touch screen, mouse, etc., and a memory 712 coupled together via a bus 714 over which the various elements may interchange data and information. Wired interface 702 couples edge device 700 to a network, such as network 134 shown in FIG. 1A and/or any local area networks. Wired interface 702 includes a receiver 720 and a transmitter 722 by which edge device 700 receives/transmits data and information to/from any of NAS devices 108 and NMS 130 and/or NAC systems 180. Though only one interface is shown by way of example, edge device 700 may have multiple communication interfaces and/or multiple communication interface ports.

Memory 712 stores executable software applications 732, operating system 740 and data/information 730. Data 730 may include a system log and/or an error log that stores event data, including behavior data, for edge device 700. Tunneling service 744 provides on-premises tunnel termination from APs and other NAS devices. Tunneling service 744 further provides a secure tunnel proxy to NMS 130 and/or NAC systems 180. In one scenario, one or more of the NAS devices 108, e.g., switch 146A from FIG. 1B, may not support establishment of RadSec tunnels directly with NMS 130 and/or NAC systems 180. In this scenario, tunneling service 744 of edge device 700 provides a RadSec proxy to enable RADIUS packets received from switch 146A via a RADIUS tunnel 178A to be tunneled to NAC system 180A using a RadSec tunnel 182A, as shown in FIG. 1B.

Access control module 756 may enforce a security policy 175 (FIG. 1A). For example, access control module 756 may receive ACLs 452 that are generated to implement security policy 175 and received from security enforcer 400 (e.g., a firewall 114). Access control module 756 may apply ACLs 452 to network traffic sent and received by AP device 500 via interfaces 720 and 722.

FIGS. 8A-8D are conceptual diagrams illustrating example operations of a network access controller during connection and disconnection of a client device to network system 100. The examples illustrated in FIGS. 8A-8D show connections and disconnections of users 810A and 810B using client devices 808A and 808B. Client devices 808A and 808B may each be, for example, one of client devices 148 of FIG. 1. In the example, shown in FIGS. 8A-8D, client devices 808A and 808B connect to network devices 822A and 822B. Network devices 822A and 822B may each be one of APs 142, switches 146 and/or routers 147.

Figure 8A:
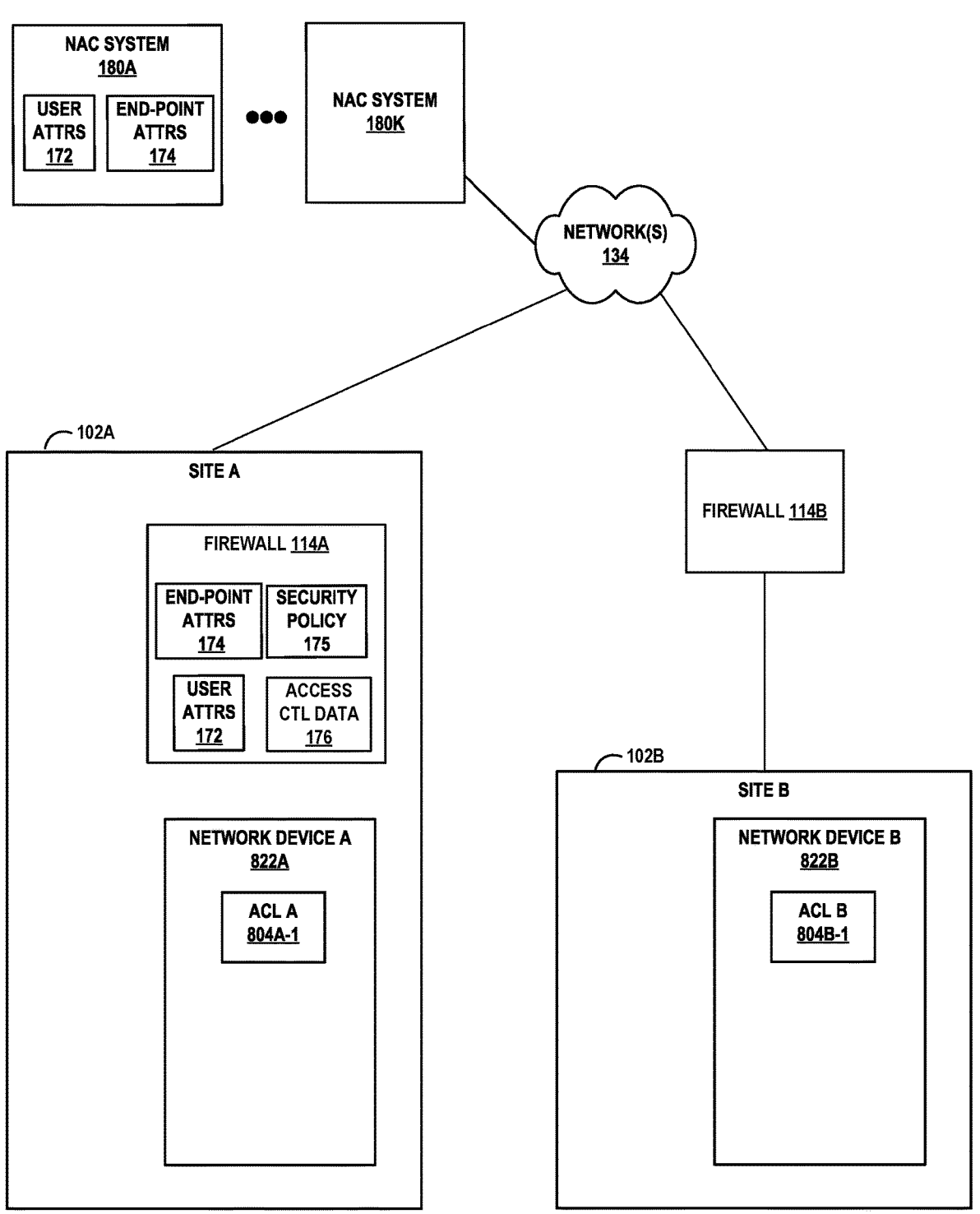
FIGS. 8A-8D are conceptual diagrams illustrating example operations of a network access controller during connection and disconnection of a client device to network system.

FIG. 8A illustrates an initial state of two network devices 822A and 822B prior to connections by client devices 808A and 808B. In this initial state, network devices 822A and 822B have corresponding ACLs 804A-1 and 804B-1 that are used by the corresponding network devices to enforce a security policy using ACEs that define which network traffic is allowed and which network traffic is denied. As an example, firewall 114A and 114B may have previously established ACLs 804A-1 and 804B-1 based on previous connections of client devices.

Figure 8B:
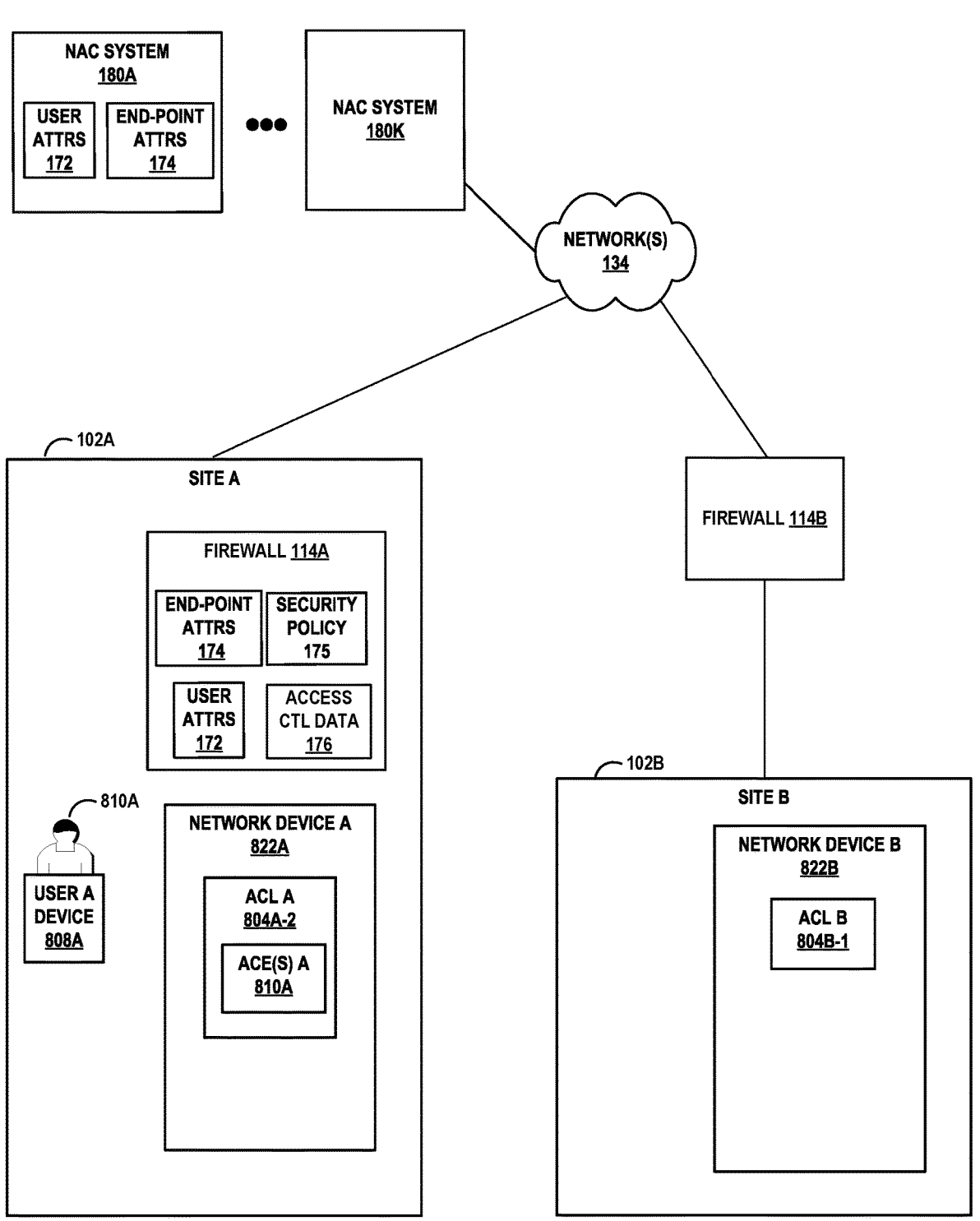

FIG. 8B illustrates a state of network devices 822A and 822B after user 810A connects to the network using client device 808A. After receiving a connection request from client device 808A, NAC system 180A obtains user attributes 172 associated with user 810A and endpoint attributes 174 associated with client device 808A. NAC system 180A can provide user attributes 172 and endpoint attributes 174 to firewall 114A. Firewall 114A can utilize user attributes 172 and endpoint attributes 174, along with security policy 175 to generate access control data 176. In this example, access control data 176 comprises access control entries 810A. Firewall 114A generates a new ACL for network device A, ACL 804A-2 that includes ACEs 810A that enforce security policy 175 with respect to network traffic to and from client device 808A. In some aspects, the new ACL can be a modification of an existing ACL. In some aspects, if network device 822A supports multiple ACLs, the new ACL can be added to the set of existing ACLs of network device 822A.

Figure 8C:
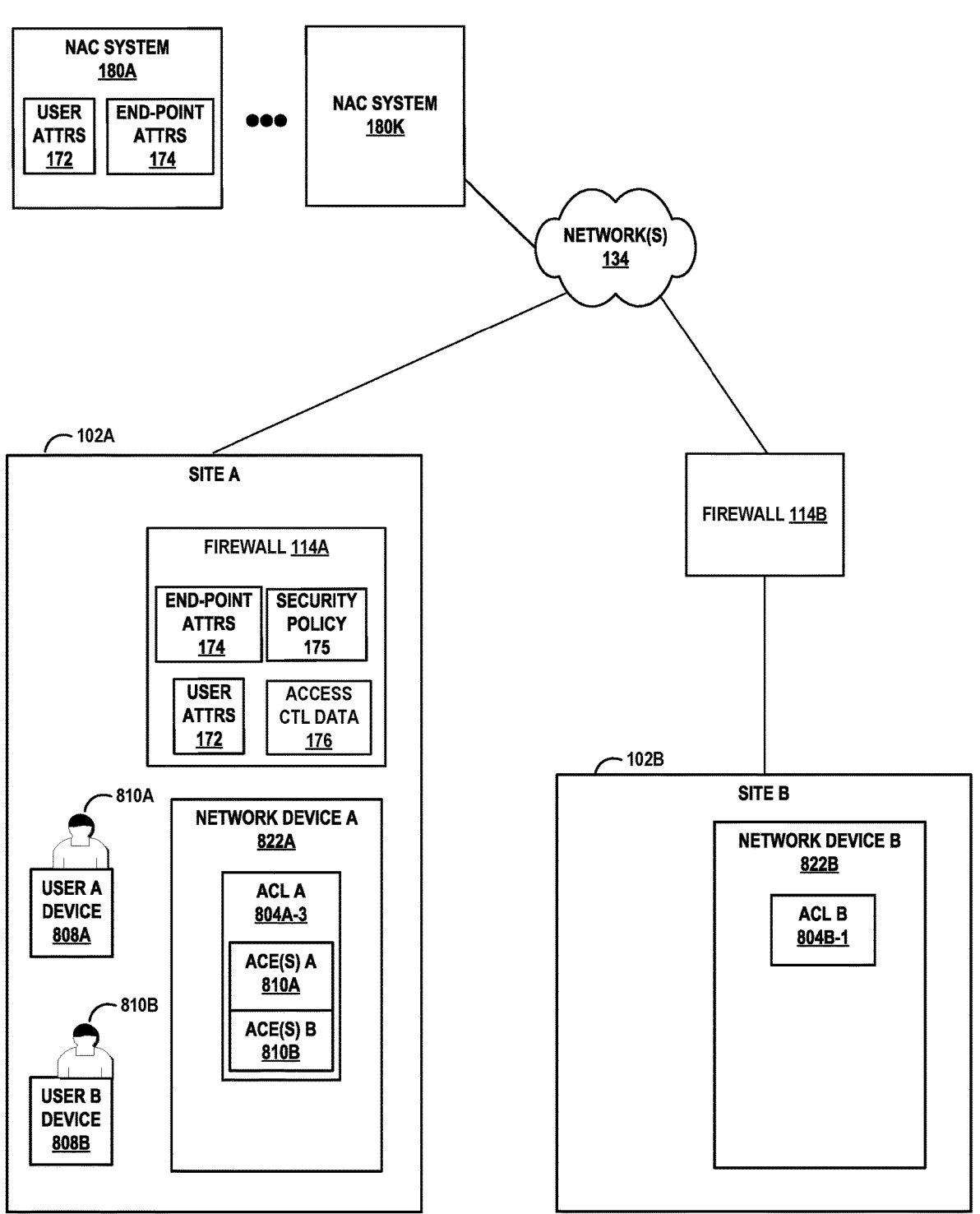

FIG. 8C illustrates a state of network devices 822A and 822B after user 810B connects to the network using client device 808B. After receiving a connection request from client device 808B, NAC system 180A obtains user attributes 172 associated with user 810B and endpoint attributes 174 associated with client device 808B. NAC system 180A utilizes the user attributes 172 and endpoint attributes 174, along with security policy 175 to generate access control data 176. In this example, access control data 176 comprises access control entries 810B. NAC system 180 provides user attributes 172 and endpoint attributes 174 to firewall 114. Firewall 114 generates a new ACL for network device 822A, ACL 804A-3 that includes ACEs 810B that enforce security policy 175 with respect to network traffic to and from client device 808B.

Figure 8D:
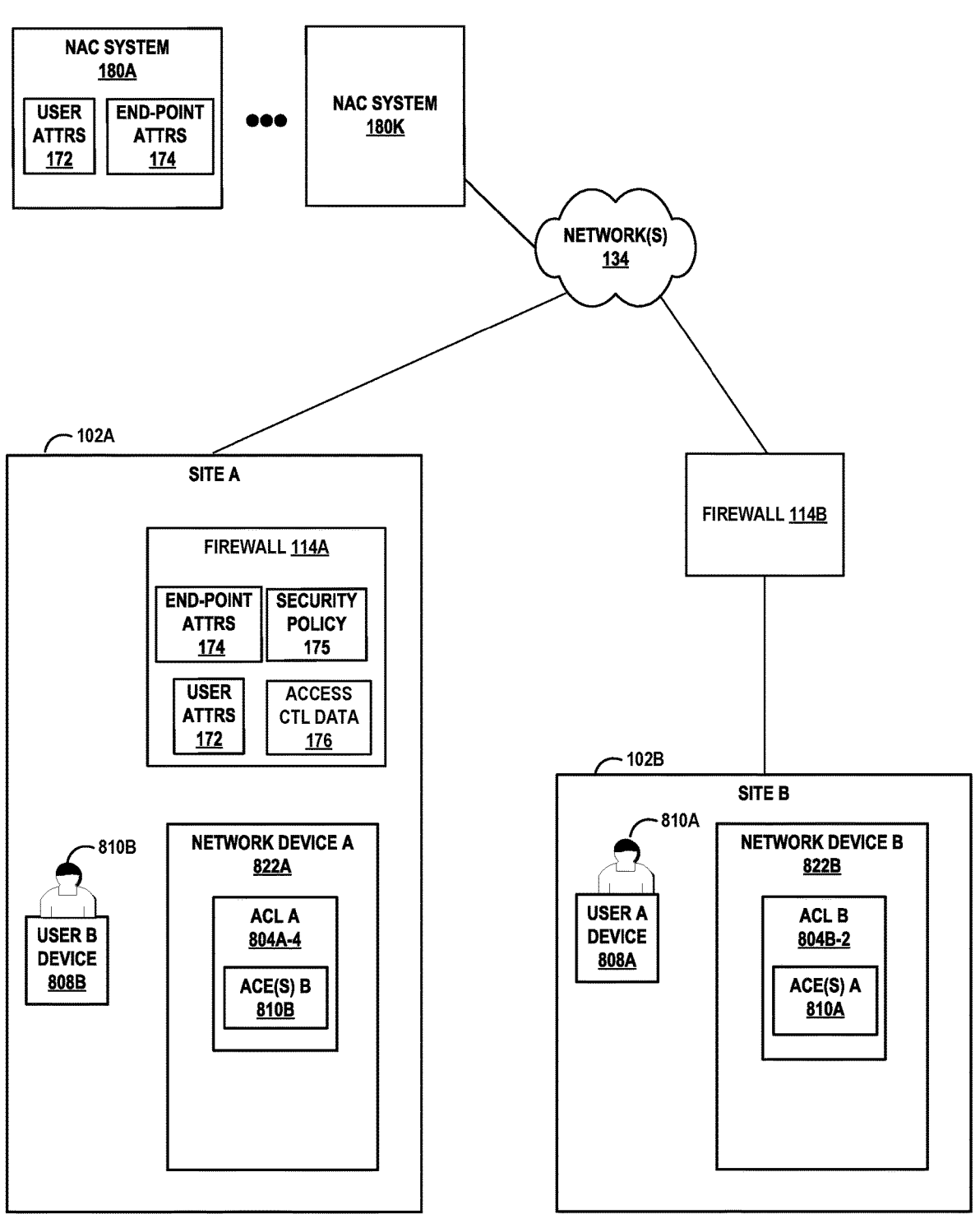

FIG. 8D illustrates a state of network devices 822A and 822B after client device 808A disconnects from the network. In response to detecting that client device 808A is no longer connected to the network, NAC system 180A can notify firewall 114A that client device 808A is no longer connected to network device 822A. In response to the notification, firewall 114 can generate a new ACL for network device 822A, ACL 804A-4 that no longer includes ACEs 810A related to client device 808A and user 810A. In some aspects, firewall 114A can modify an existing ACL such that ACEs associated with client device 808A are no longer included in the ACL. In some aspects, firewall 114 can delete an ACL that was previously created with ACEs associated with client device 808A. In this example, client device 808B remains connected to network device 822A, and thus the new ACL 804A-4 retains ACEs associated with client device 808B.

In the example of FIG. 8D, user A reconnects to the network at site 102B. After receiving a connection request from client device 808A at site 102B, NAC system 180A obtains user attributes 172 associated with user 810A and endpoint attributes 174 associated with client device 808A. NAC system 180A can provide firewall 114B with user attributes 172 and endpoint attributes 174. Firewall 114B can utilize the user attributes 172 and endpoint attributes 174, along with security policy 175 to generate access control data 176. In this example, access control data 176 comprises access control entries 810A associated with user 810A and client device 808A. NAC system 180 generates a new ACL for network device 822B, ACL 804B-2 that includes ACEs 810A that enforce security policy 175 with respect to network traffic to and from client device 808A.

FIG. 9 is a flow diagram illustrating an example operation of a network access controller, in accordance with one or more techniques of this disclosure. A network access controller may receive a request to connect to an enterprise network from a client device of a user (905). The network access controller may, in response to the receiving the request, determine one or more user attributes associated with the user and one or more endpoint attributes of the client device (910). Next, the network access controller may provided the user attributes and endpoint attributes to a security enforcer, which can identify a security policy of the one or more security policies based on the one or more user attributes and the one or more endpoint attributes (915). Next, the security enforcer may configure a network device of the enterprise network in accordance with the security policy (920).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
a memory; and
one or more processors coupled to the memory and configured to:
    obtain, based on a request for a client device to access an enterprise network, one or more user attributes associated with a user of the client device and one or more endpoint attributes associated with the client device;
    determine, based on the one or more user attributes and the one or more endpoint attributes, an identifier of the client device, wherein the identifier is not a network address of the client device;
    identify a security policy of one or more intent-based security policies for the enterprise network based on the identifier of the client device belonging to a category of client devices associated with the security policy, wherein the one or more intent-based security policies are expressed based on user intention with respect to one or more categories of client devices;

automatically generate, based on the security policy, an access control entry for inclusion in an access control list associated with the category of client devices; and
automatically configure a network device of the enterprise network with the access control list to enforce the security policy with respect to network traffic associated with the client device.

2. The system of claim 1, wherein the identifier of the client device comprises a digital fingerprint of the client device.

3. The system of claim 1, wherein the network device comprises a set of access control lists, and wherein to automatically configure the network device with the access control list associated with the category of client devices, the one or more processors are further configured to:
    add the access control list to the set of access control lists of the network device.

4. The system of claim 3, wherein the one or more processors are further configured to, in response to a determination that the client device has disconnected from the network, remove the access control list from the set of access control lists of the network device.

5. The system of claim 1, wherein the network device comprises an access point, a router, or a switch.

6. The system of claim 1, wherein the user attributes include one or more of a name of the user, a group of which the user is a member, a home-office location of the user, a grade of the user, a department, an organization, or a role.

7. The system of claim 1, wherein the endpoint attributes include one or more of a vendor, a make, a model, an operating system (OS) version, a WiFi service set identifier (SSID), a media access control (MAC) address, an Internet Protocol (IP) address, a time-of-connection, a communication pattern, a network port, a location, or a label associated with the client device.

8. The system of claim 1, wherein the system comprises a cloud-based system and one of a cloud-based firewall or an on-premise firewall for the enterprise network.

9. A method comprising:
obtaining, based on a request for a client device to access an enterprise network, one or more user attributes associated with a user of the client device and one or more endpoint attributes associated with the client device;
determining, based on the one or more user attributes and the one or more endpoint attributes, an identifier of the client device, wherein the identifier is not a network address of the client device;
identifying a security policy of one or more intent-based security policies for the enterprise network based on the identifier of the client device belonging to a category of client devices associated with the security policy, wherein the one or more intent-based security policies are expressed based on user intention with respect to one or more categories of client devices;
automatically generating, based on the security policy, an access control entry for inclusion in an access control list associated with the category of client devices; and
automatically configuring a network device of the enterprise network with the access control list to enforce the security policy with respect to network traffic associated with the client device.

10. The method of claim 9, wherein the identifier of the client device comprises a digital fingerprint of the client device.

11. The method of claim 9, wherein the network device comprises a set of access control lists, and wherein automatically configuring the network device with the access control list associated with the category of client devices comprises:

adding the access control list to the set of access control lists of the network device.

12. The method of claim 11, further comprising:

in response to determining that the client device has disconnected from the network, removing the access control list from the set of access control lists of the network device.

13. The method of claim 9, wherein the network device comprises one of an access point, a router, or a switch.

14. The method of claim 9, wherein the user attributes include one or more of a name of the user, a group of which the user is a member, a home office location of the user, a grade of the user, a department, an organization, or a role.

15. The method of claim 9, wherein the endpoint attributes include one or more of a vendor, a make, a model, an operating system (OS) version, a WiFi service set identifier (SSID), a media access control (MAC) address, an Internet Protocol (IP) address, a time-of-connection, a communication pattern, a network port, a location, or a label associated with the client device.

16. Non-transitory computer-readable storage media comprising instructions that, when executed by processing circuitry, cause the processing circuitry to:

obtain, based on a request for a client device to access an enterprise network, one or more user attributes associated with a user of the client device and one or more endpoint attributes associated with the client device;

determine, based on the one or more user attributes and the one or more endpoint attributes, an identifier of the client devices, wherein the identifier is not a network address of the client device;

identify a security policy of one or more intent-based security policies for the enterprise network based on the identifier of the client device belonging to a category of client devices associated with the security policy, wherein the one or more intent-based security policies are expressed based on user intention with respect to one or more categories of client devices;

automatically generate, based on the security policy, an access control entry for inclusion in an access control list associated with the category of client devices; and automatically configure a network device of the enterprise network with the access control list to enforce the security policy with respect to network traffic associated with the client device.

17. The system of claim 1, wherein the network device comprises an on-premises network device, and wherein the system comprises a cloud-based system configured to manage enforcement of the intent-based security policies by at least the on-premises network device.

* * * * *